US009893324B2

(12) United States Patent
Osawa et al.

(10) Patent No.: US 9,893,324 B2
(45) Date of Patent: Feb. 13, 2018

(54) METHOD OF DESIGNING ELECTROLUMINESCENT DEVICE, ELECTROLUMINESCENT DEVICE MANUFACTURED WITH THE DESIGN METHOD, AND METHOD OF MANUFACTURING ELECTROLUMINESCENT DEVICE WITH THE DESIGN METHOD

(71) Applicant: KONICA MINOLTA, INC., Chiyoda-ku, Tokyo (JP)

(72) Inventors: Kou Osawa, Hino (JP); Koujirou Sekine, Ibaraki (JP); Mitsuru Yokoyama, Takatsuki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/319,593

(22) PCT Filed: Jun. 2, 2015

(86) PCT No.: PCT/JP2015/065844
§ 371 (c)(1),
(2) Date: Dec. 16, 2016

(87) PCT Pub. No.: WO2015/194359
PCT Pub. Date: Dec. 23, 2015

(65) Prior Publication Data
US 2017/0179443 A1 Jun. 22, 2017

(30) Foreign Application Priority Data
Jun. 20, 2014 (JP) .................................. 2014-127360

(51) Int. Cl.
*H01L 51/56* (2006.01)
*H01L 51/52* (2006.01)
(Continued)

(52) U.S. Cl.
CPC .......... *H01L 51/56* (2013.01); *G06F 17/5081* (2013.01); *H01L 33/44* (2013.01);
(Continued)

(58) Field of Classification Search
CPC ......... H01L 51/56; H01L 33/44; H01L 33/58; H01L 51/0031; H01L 51/5265;
(Continued)

(56) References Cited

U.S. PATENT DOCUMENTS

2008/0225201 A1* 9/2008 Hoshi ............... G02F 1/133606
349/62

FOREIGN PATENT DOCUMENTS

| JP | 2009-054382 A | 3/2009 |
|---|---|---|
| JP | 2010-147337 A | 7/2010 |
| WO | 2014-065084 A1 | 5/2014 |

OTHER PUBLICATIONS

International Search Report dated Aug. 11, 2015 from the corresponding International Application No. PCT/JP2015/065844; English translation of International Search Report; Total of 5 pages.
(Continued)

*Primary Examiner* — Karen Kusumakar
(74) *Attorney, Agent, or Firm* — Lucas & Mercanti, LLP

(57) ABSTRACT

A method of designing an electroluminescent device allows more accurate computation of an external emission spectrum output to the outside in a current injection state and accurate estimate of a quantity and/or a color of light extracted to the outside, an electroluminescent device manufactured with the design method, and a method of manufacturing an electroluminescent device with the design method.

7 Claims, 20 Drawing Sheets

(51) Int. Cl.
- *H01L 33/44* (2010.01)
- *H01L 33/58* (2010.01)
- *H01L 51/00* (2006.01)
- *G06F 17/50* (2006.01)

(52) U.S. Cl.
CPC .......... *H01L 33/58* (2013.01); *H01L 51/0031* (2013.01); *H01L 51/5265* (2013.01); *H01L 51/5268* (2013.01); *H01L 51/5275* (2013.01); *G06F 2217/12* (2013.01); *H01L 2251/558* (2013.01); *H01L 2251/56* (2013.01); *H01L 2933/0025* (2013.01); *H01L 2933/0058* (2013.01); *H01L 2933/0091* (2013.01)

(58) Field of Classification Search
CPC ............ H01L 51/5268; H01L 51/5275; H01L 2251/558; H01L 2251/56; H01L 2933/0025; H01L 2933/0058; H01L 2933/0091; G06F 17/5081; G06F 2217/12
See application file for complete search history.

(56) References Cited

OTHER PUBLICATIONS

Written Opinion of PCT dated Aug. 11, 2015 from the corresponding International Application No. PCT/JP2015/065844; English translation of Written Opinion of PCT; Total of 7 pages.
Applied Physics Letter 97, 253305 (2010), "Quantification of energy loss mechanisms in organic light-emitting diodes", by Rico Meerheim, et. al.: Total of 3 pages.
An Office Action dated Aug. 30, 2017 from corresponding Korean Patent Application No. KR 10-2016-7034773 and English translation.

* cited by examiner

FIG.14

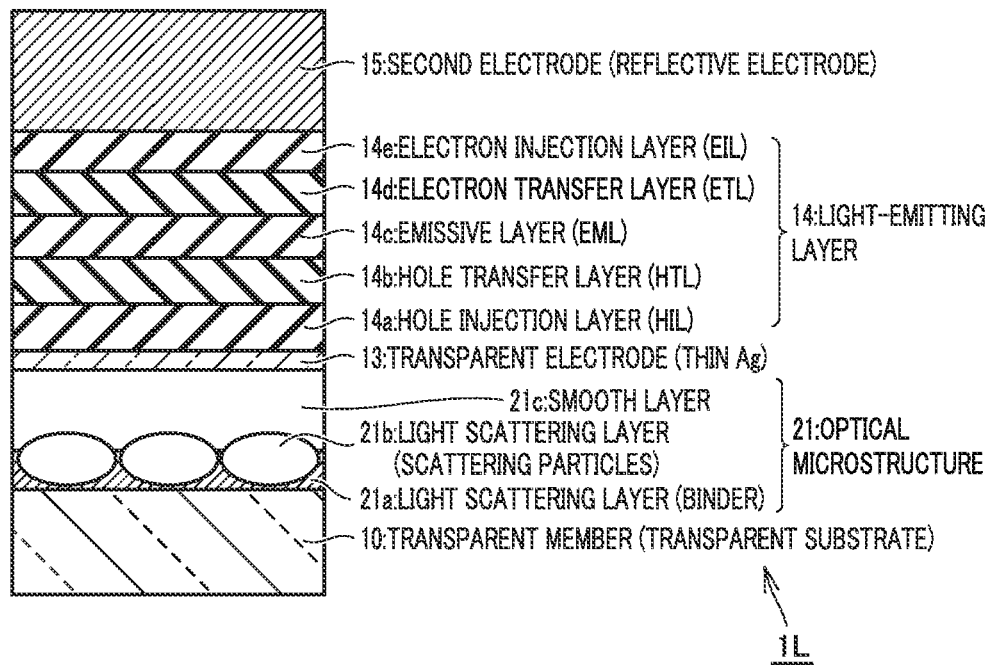

- 15:SECOND ELECTRODE (REFLECTIVE ELECTRODE)
- 14e:ELECTRON INJECTION LAYER (EIL)
- 14d:ELECTRON TRANSFER LAYER (ETL)
- 14c:EMISSIVE LAYER (EML)  } 14:LIGHT-EMITTING LAYER
- 14b:HOLE TRANSFER LAYER (HTL)
- 14a:HOLE INJECTION LAYER (HIL)
- 13:TRANSPARENT ELECTRODE (THIN Ag)
- 21c:SMOOTH LAYER
- 21b:LIGHT SCATTERING LAYER (SCATTERING PARTICLES)  } 21:OPTICAL MICROSTRUCTURE
- 21a:LIGHT SCATTERING LAYER (BINDER)
- 10:TRANSPARENT MEMBER (TRANSPARENT SUBSTRATE)

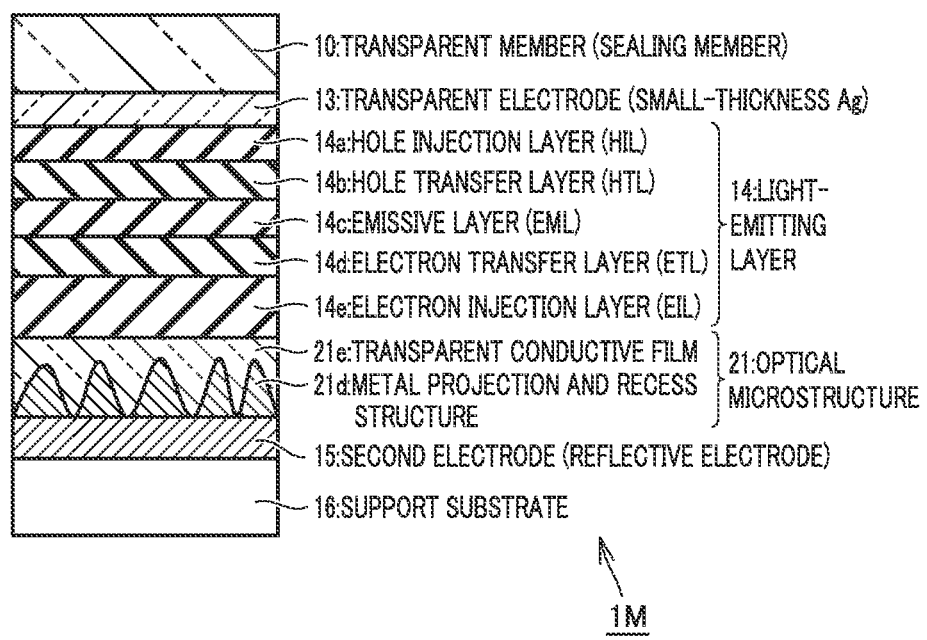

- 10:TRANSPARENT MEMBER (SEALING MEMBER)
- 13:TRANSPARENT ELECTRODE (SMALL-THICKNESS Ag)
- 14a:HOLE INJECTION LAYER (HIL)
- 14b:HOLE TRANSFER LAYER (HTL)
- 14c:EMISSIVE LAYER (EML)  } 14:LIGHT-EMITTING LAYER
- 14d:ELECTRON TRANSFER LAYER (ETL)
- 14e:ELECTRON INJECTION LAYER (EIL)
- 21e:TRANSPARENT CONDUCTIVE FILM
- 21d:METAL PROJECTION AND RECESS STRUCTURE  } 21:OPTICAL MICROSTRUCTURE
- 15:SECOND ELECTRODE (REFLECTIVE ELECTRODE)
- 16:SUPPORT SUBSTRATE

1M

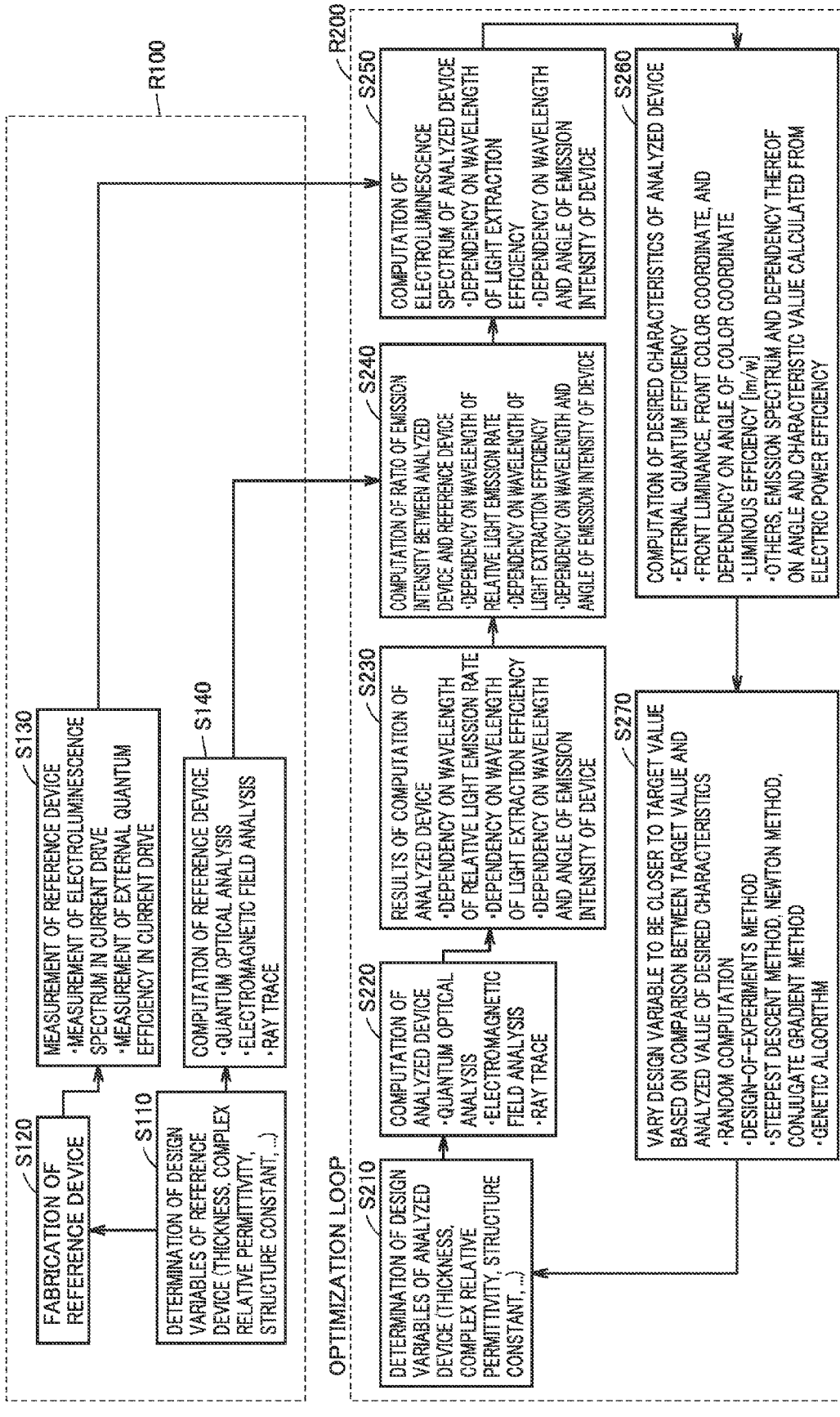

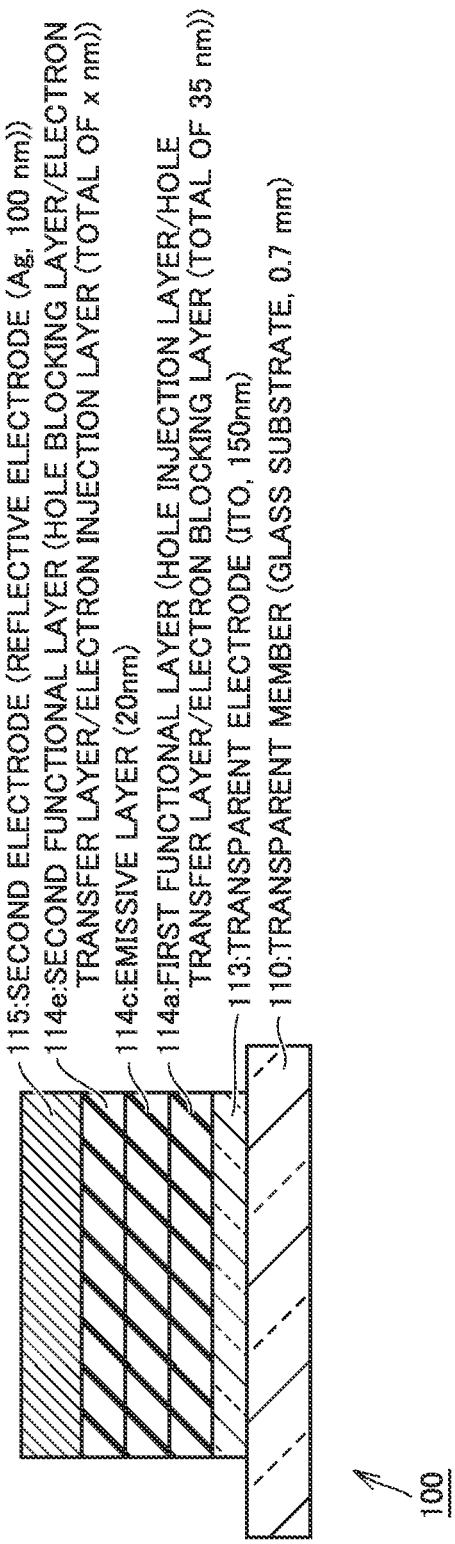

FIG.23

| CONSTITUENT MEMBER | SPECIFIC NAME | DESIGN VARIABLE | |
|---|---|---|---|
| | | THICKNESS | COMPLEX RELATIVE PERMITTIVITY |
| 115:SECOND ELECTRODE | Ag | 100 nm | $\varepsilon 6$ |
| 114e:SECOND FUNCTIONAL LAYER | HOLE BLOCKING LAYER · ELECTRON TRANSFER LAYER · ELECTRON INJECTION LAYER | 50 nm | $\varepsilon 5$ |
| 114c:EMISSIVE LAYER | LIGHT–EMITTING LAYER | 20 nm | $\varepsilon 4$ |
| 114a:FIRST FUNCTIONAL LAYER | HOLE INJECTION LAYER · HOLE TRANSFER LAYER · ELECTRON BLOCKING LAYER | 35 nm | $\varepsilon 3$ |
| 113:TRANSPARENT ELECTRODE | ITO | 150 nm | $\varepsilon 2$ |
| 110:TRANSPARENT MEMBER | GLASS SUBSTRATE | 700 MICROMETERS | $\varepsilon 1$ |

| ITEM TO BE MEASURED | NOTATION | UNIT |
|---|---|---|
| DRIVE CURRENT | $I_{in}$ | [A] |
| DRIVE VOLTAGE | $V_{in}$ | [V] |
| ELECTROLUMINESCENCE SPECTRUM | $S_{EL1}(\lambda)$ | [/s/nm] |
| AREA OF DEVICE | $S_{dev}$ | [m²] |
| TEMPERATURE OF DEVICE | $T_{dev}$ | [K] |
| FRONT LUMINANCE | $I_{cd}$ | [cd/m2] |
| FRONT CHROMATICITY x | x | DIMENSIONLESS |
| FRONT CHROMATICITY y | y | DIMENSIONLESS |
| FRONT COLOR TEMPERATURE | T | [K] |

FIG.26

| ITEM TO BE COMPUTED (REFERENCE DEVICE) | NOTATION | UNIT | ANALYSIS TECHNIQUE |
|---|---|---|---|
| DEPENDENCY ON WAVELENGTH OF RELATIVE RADIATIVE RECOMBINATION RATE (PURCELL FACTOR) | $F_i(\lambda)$ | DIMENSIONLESS | QUANTUM OPTICAL ANALYSIS · ELECTROMAGNETIC FIELD ANALYSIS |
| EFFICIENCY OF LIGHT EXTRACTION INTO AIR | $\eta_{Air1}(\lambda)$ | DIMENSIONLESS | ELECTROMAGNETIC FIELD ANALYSIS · RAY TRACE |
| DISTRIBUTION OF ANGLES OF LIGHT INTENSITY IN AIR AT SPECIFIC WAVELENGTH | $D_{Air1}(\lambda, \theta)$ | [/sr] | ELECTROMAGNETIC FIELD ANALYSIS · RAY TRACE |
| EFFICIENCY OF LIGHT EXTRACTION INTO TRANSPARENT MEMBER | $\eta_{Sub1}(\lambda)$ | DIMENSIONLESS | ELECTROMAGNETIC FIELD ANALYSIS · RAY TRACE |
| DISTRIBUTION OF ANGLES OF LIGHT INTENSITY IN TRANSPARENT MEMBER AT SPECIFIC WAVELENGTH | $D_{Sub1}(\lambda, \theta)$ | [/sr] | ELECTROMAGNETIC FIELD ANALYSIS · RAY TRACE |

FIG.27

| ITEM TO BE COMPUTED (ANALYZED DEVICE IN Nth LOOP) | NOTATION | UNIT | ANALYSIS TECHNIQUE |
|---|---|---|---|
| DEPENDENCY ON WAVELENGTH OF RELATIVE RADIATIVE RECOMBINATION RATE (PURCELL FACTOR) | $F[N](\lambda)$ | DIMENSIONLESS | QUANTUM OPTICAL ANALYSIS · ELECTROMAGNETIC FIELD ANALYSIS |
| EFFICIENCY OF LIGHT EXTRACTION INTO AIR | $\eta_{Air}[N](\lambda)$ | DIMENSIONLESS | ELECTROMAGNETIC FIELD ANALYSIS · RAY TRACE |
| DISTRIBUTION OF ANGLES OF LIGHT INTENSITY IN AIR AT SPECIFIC WAVELENGTH | $D_{Air}[N](\lambda, \theta)$ | [/sr] | ELECTROMAGNETIC FIELD ANALYSIS · RAY TRACE |
| EFFICIENCY OF LIGHT EXTRACTION INTO TRANSPARENT MEMBER | $\eta_{Sub}[N](\lambda)$ | DIMENSIONLESS | ELECTROMAGNETIC FIELD ANALYSIS · RAY TRACE |
| DISTRIBUTION OF ANGLES OF LIGHT INTENSITY IN TRANSPARENT MEMBER AT SPECIFIC WAVELENGTH | $D_{Sub}[N](\lambda, \theta)$ | [/sr] | ELECTROMAGNETIC FIELD ANALYSIS · RAY TRACE |

FIG.28

| ITEM TO BE COMPUTED (ANALYZED DEVICE IN Nth LOOP) | NOTATION | UNIT |
|---|---|---|
| RATIO OF INTENSITY OF ENERGY EMITTED INTO AIR, TO REFERENCE DEVICE | $G_{Air}[N](\lambda)$ | DIMENSIONLESS |
| RATIO OF INTENSITY OF ENERGY EMITTED INTO TRANSPARENT MEMBER, TO REFERENCE DEVICE | $G_{Sub}[N](\lambda)$ | DIMENSIONLESS |
| COMPUTED VALUE OF ELECTROLUMINESCENCE SPECTRUM | $S_{EL}[N](\lambda)$ | [/s/nm] |
| COMPUTED VALUE OF ELECTROLUMINESCENCE SPECTRUM IN TRANSPARENT MEMBER | $S_{EL\_Sub}[N](\lambda)$ | [/s/nm] |

FIG.29

| ITEM TO BE COMPUTED (ANALYZED DEVICE IN Nth LOOP) | NOTATION | DIMENSION |
|---|---|---|
| ELECTRIC POWER EFFICIENCY | $LPW[N]$ | [lm/W] |
| CURRENT EFFICIENCY | $LPA[N]$ | [lm/A] |
| EXTERNAL QUANTUM EFFICIENCY | $EQE[N]$ | DIMENSIONLESS |
| FRONT LUMINANCE | $Y[N]$ | [cd/m$^2$] |
| FRONT CHROMATICITY x | $x[N]$ | DIMENSIONLESS |
| FRONT CHROMATICITY y | $y[N]$ | DIMENSIONLESS |
| FRONT COLOR TEMPERATURE | $T[N]$ | [K] |
| FRONT COLOR RENDERING PROPERTY | $Ra[N]$ | DIMENSIONLESS |
| DEPENDENCY ON ANGLE OF COLOR COORDINATE x | $x_\theta[N](\theta)$ | DIMENSIONLESS |
| DEPENDENCY ON ANGLE OF COLOR COORDINATE y | $y_\theta[N](\theta)$ | DIMENSIONLESS |

FIG.30

| CONSTITUENT MEMBER | SPECIFIC NAME | DESIGN VARIABLE | |
| --- | --- | --- | --- |
| | | THICKNESS | COMPLEX RELATIVE PERMITTIVITY |
| 115:SECOND ELECTRODE | Ag | 100 nm | ε 6 |
| 114e:SECOND FUNCTIONAL LAYER | HOLE BLOCKING LAYER ·ELECTRON TRANSFER LAYER ·ELECTRON INJECTION LAYER | 113 nm | ε 5 |
| 114c:EMISSIVE LAYER | LIGHT-EMITTING LAYER | 20 nm | ε 4 |
| 114a:FIRST FUNCTIONAL LAYER | HOLE INJECTION LAYER ·HOLE TRANSFER LAYER ·ELECTRON BLOCKING LAYER | 37 nm | ε 3 |
| 113:TRANSPARENT ELECTRODE | ITO | 150 nm | ε 2 |
| 110:TRANSPARENT MEMBER | GLASS SUBSTRATE | 700 MICROMETERS | ε 1 |

FIG.31
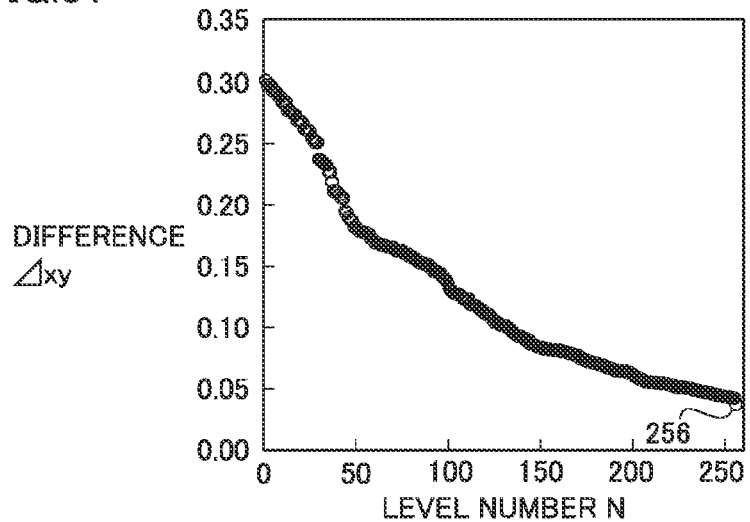
FIG.32
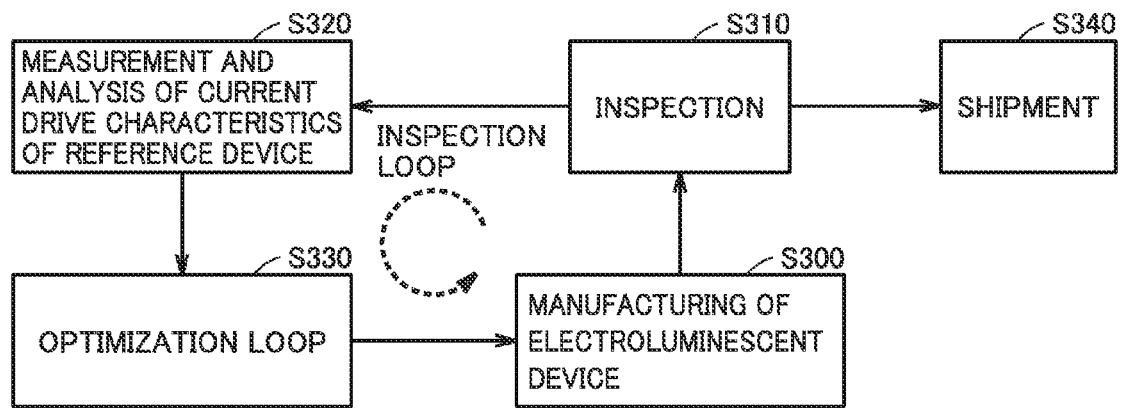
FIG.33
| DISTANCE x FROM REFLECTIVE ELECTRODE TO LIGHT-EMITTING LAYER [nm] | | | 40 | 60 | 70 | 120 |
|---|---|---|---|---|---|---|
| EXPERIMENT | FRONT COLOR CHROMATICITY | x | 0.451 | 0.463 | 0.479 | 0.555 |
| | | y | 0.538 | 0.526 | 0.513 | 0.431 |
| | EQE | AIR | 18.1% | 20.5% | 18.5% | 8.6% |
| COMPARATIVE EXAMPLE | FRONT COLOR CHROMATICITY | x | 0.481 | 0.489 | 0.498 | 0.597 |
| | | y | 0.511 | 0.504 | 0.496 | 0.393 |
| | EQE | AIR | 18.3% | 22.6% | 20.8% | 8.8% |
| PRESENT EXAMPLE | FRONT COLOR CHROMATICITY | x | 0.461 | 0.468 | 0.477 | 0.581 |
| | | y | 0.530 | 0.523 | 0.515 | 0.406 |
| | EQE | AIR | 17.3% | 21.2% | 19.3% | 7.8% |

FIG.34

| TOTAL THICKNESS x FROM REFLECTIVE ELECTRODE TO LIGHT-EMITTING LAYER [nm] | | | 40 | 60 | 70 | 120 | MAXIMUM ERROR | ERROR LESSENING FACTOR |
|---|---|---|---|---|---|---|---|---|
| EXPERIMENT | FRONT COLOR CHROMATICITY | x | — | — | — | — | — | — |
| | | y | — | — | — | — | — | — |
| | EQE | AIR | — | — | — | — | — | — |
| COMPARATIVE EXAMPLE | FRONT COLOR CHROMATICITY | x | 0.031 | 0.026 | 0.019 | 0.042 | 0.042 | — |
| | | y | 0.027 | 0.022 | 0.017 | 0.038 | 0.038 | — |
| | EQE | AIR | 0.1% | 2.2% | 2.3% | 0.2% | 2.3% | — |
| PRESENT EXAMPLE | FRONT COLOR CHROMATICITY | x | 0.010 | 0.005 | 0.001 | 0.026 | 0.026 | 0.026 |
| | | y | 0.008 | 0.003 | 0.002 | 0.025 | 0.025 | 0.042 |
| | EQE | AIR | 0.8% | 0.8% | 0.8% | 0.8% | 0.8% | 0.348 |

US 9,893,324 B2

METHOD OF DESIGNING ELECTROLUMINESCENT DEVICE, ELECTROLUMINESCENT DEVICE MANUFACTURED WITH THE DESIGN METHOD, AND METHOD OF MANUFACTURING ELECTROLUMINESCENT DEVICE WITH THE DESIGN METHOD

CROSS REFERENCE TO RELATED APPLICATION

This Application is a 371 of PCT/JP2015/065844 filed on Jun. 2, 2015 which, in turn, claimed the priority of Japanese Patent Application No. 2014-127360 filed on Jun. 20, 2014, both applications are incorporated herein by reference.

TECHNICAL FIELD

The present invention relates to a method of designing an electroluminescent device, an electroluminescent device manufactured with the design method, and a method of manufacturing an electroluminescent device with the design method.

BACKGROUND ART

A surface emitting device high in luminous efficiency which includes an electroluminescent device such as a light-emitting diode (LED) or organic EL has recently attracted attention. The electroluminescent device is formed from an emissive layer lying between a planar cathode and a planar anode, and generally in many cases, it is formed from a transparent electrode as an anode and a metal reflective electrode as a cathode.

When the cathode is formed from a metal electrode, light is extracted from a side of the transparent anode, and the electroluminescent device is used as a single-emission light emitting device. When electrodes on opposing sides are formed from transparent electrodes, a transparent light emitting device can be obtained and applications to decorative lighting are expected. Light emitted in an emissive layer is not totally extracted. There are a substrate mode in which light is confined in a transparent base material, a waveguide mode in which light is confined in an emissive layer or a transparent electrode, and a plasmon mode in which light is confined in a metal electrode, which are factors for restriction of luminous efficiency of a device.

When an electroluminescent device is used for lighting or as a decorative light source, a color or a luminance of light which comes outside is important. A color or a luminance of light extracted to the outside, however, is varied due to interference with an optical multi-layer, and control thereof is disadvantageously difficult. It is important in applications to estimate a color or a luminance of light extracted to the outside.

A computation method based on a photoluminescence spectrum of a light-emitting material is disclosed in Japanese Laid-Open Patent Publication No. 2010-147337 (PTD 1) and Japanese Laid-Open Patent Publication No. 2009-054382 (PTD 2) as a method of designing a color coordinate or a luminance of light which can be extracted to the outside. A detailed method of computing light extraction efficiency is disclosed in R. Meerheim et. al., Appl. Phys. Lett., 97, 253305 (2010) (NPD 1).

CITATION LIST

Patent Document

PTD 1: Japanese Laid-Open Patent Publication No. 2010-147337
PTD 2: Japanese Laid-Open Patent Publication No. 2009-054382

Non Patent Document

NPD 1: R. Meerheim et. al., Appl. Phys. Lett., 97, 253305 (2010)

SUMMARY OF INVENTION

Technical Problem

In PTDs 1 and 2, however, an external spectrum is computed based on a photoluminescence spectrum, and an electroluminescence spectrum in an actual current injection state of a device cannot accurately be computed.

In NPD 1, a spectrum in an emissive layer should be assumed, however, NPD 1 is insufficient in detailed explanation as to how to set a ratio between electron injection and internal spectrum intensity and to set a shape of an internal spectrum so as to lessen an error between experiments and computation or in explanation of a difference between a photoluminescence spectrum and an electroluminescence spectrum, and a difference between experiments and computation has remained.

The present invention was made in view of the problems above, and the present invention provides a method of designing an electroluminescent device which allows more accurate computation of an external emission spectrum output to the outside in a current injection state and accurate estimation of a quantity and/or a color of light extracted to the outside, an electroluminescent device manufactured with the design method, and a method of manufacturing an electroluminescent device with the design method.

Solution to Problem

A method of designing an electroluminescent device based on this invention is a method of designing an electroluminescent device having an emissive layer between a first electrode and a second electrode, the first electrode and the second electrode being transparent electrodes, the emissive layer lying between a first functional layer and a second functional layer, and the electroluminescent device having a first transparent member on a side of the first electrode opposite to a side where the emissive layer is provided. A reference device including a construction of the electroluminescent device and a desired analyzed device including a construction of the electroluminescent device are prepared. Quantum optical analysis, electromagnetic field analysis, and ray trace are performed with thicknesses and complex relative permittivities of the first transparent member, the first electrode, the first functional layer, the second functional layer, the emissive layer, and the second electrode as well as a position of a light-emitting point in the emissive layer and a distribution of light-emitting points in the emissive layer being used as design variables. A "ratio of light extraction efficiency" between the reference device and the analyzed device is calculated by computing efficiency of light extraction from the emissive layer into the transparent member or air in both of the reference device and the analyzed device. Relation of the thickness and the complex relative permittivity of each of the layers with the "ratio of light extraction efficiency" is found, the layers forming the reference device and the analyzed device. The respective thicknesses and the respective complex relative permittivities of the first transparent member, the first electrode, the first functional layer, the second functional layer, the emissive layer, and the second electrode are obtained as the design variables, based on the relation and an electroluminescence spectrum in air or the first transparent member measured by feeding a current to the reference device.

In another form, the second electrode is a transparent electrode, a second transparent member is provided on a side of the second electrode opposite to a side where the emissive layer is provided, and a complex relative permittivity and a thickness of the second transparent member are further included as design variables.

In another form, an optical buffer layer is further provided between the second electrode and the first transparent member and/or between the second electrode and the second transparent member, and the method further includes designing a thickness, a complex relative permittivity, and a structure constant of each film forming the optical buffer film as design variables.

In another form, a first optical microstructure disturbing amplitude and a phase condition of light is further provided in any region between the transparent member and the emissive layer, and the method further includes designing a structure constant and a complex relative permittivity of the first optical microstructure as design variables.

In another form, a second optical microstructure disturbing amplitude and a phase condition of light is provided at an interface between the first transparent member and the outside, and a structure constant and a complex relative permittivity of the second optical microstructure are included as design variables.

An electroluminescent device designed with the method of designing an electroluminescent device based on this invention is designed with the method of designing an electroluminescent device described in any portion described above.

A method of manufacturing an electroluminescent device based on this invention includes inspecting an electroluminescent device manufactured based on the design variables obtained with the method of designing an electroluminescent device described in any portion described above and measuring and analyzing current drive characteristics and obtaining the design variables with the method of designing an electroluminescent device described in any portion described above with the measured and analyzed electroluminescent device being employed as the reference device and manufacturing an electroluminescent device based on the design variables.

Advantageous Effects of Invention

According to this method of manufacturing an electroluminescent device, a method of designing an electroluminescent device which allows more accurate computation of an external emission spectrum output to the outside in a current injection state and accurate estimation of a quantity and/or a color of light extracted to the outside, an electroluminescent device manufactured with the design method, and a method of manufacturing an electroluminescent device with the design method can be provided.

BRIEF DESCRIPTION OF DRAWINGS

FIG. 14 is a twelfth cross-sectional view showing a construction example of an electroluminescent device in an embodiment.

FIG. 15 is a thirteenth cross-sectional view showing a construction example of an electroluminescent device in an embodiment.

FIG. 21 is a block diagram showing details of the method of designing an electroluminescent device in the embodiment.

FIG. 22 is a cross-sectional view showing a construction example of an electroluminescent device in an Example.

FIG. 23 is a diagram showing a design variable of the electroluminescent device employed as a reference device.

FIG. 26 is a diagram showing selection of an item to be computed for the reference device and an analysis technique.

FIG. 27 is a diagram showing a list of items computed for an analyzed device in an Nth-loop.

FIG. 28 is a diagram showing a ratio of intensity and an external emission spectrum computed for the analyzed device in the Nth-loop.

FIG. 29 is a diagram showing an example of an indicator of an electroluminescent device which can be computed.

FIG. 30 is a diagram showing relation between a level number N in an optimization loop and a difference Δxy from a target coordinate of a color coordinate.

FIG. 31 is a diagram showing a design variable of an optimized device.

FIG. 32 is a diagram showing a method of manufacturing an electroluminescent device with the method of designing an electroluminescent device in the present embodiment.

FIG. 33 is a diagram showing a measured value and a computed value in the Example.

FIG. 34 is a diagram showing an absolute value of an error associated with the measured value in the Example.

DESCRIPTION OF EMBODIMENTS

[1. Overview]

Figure 1:
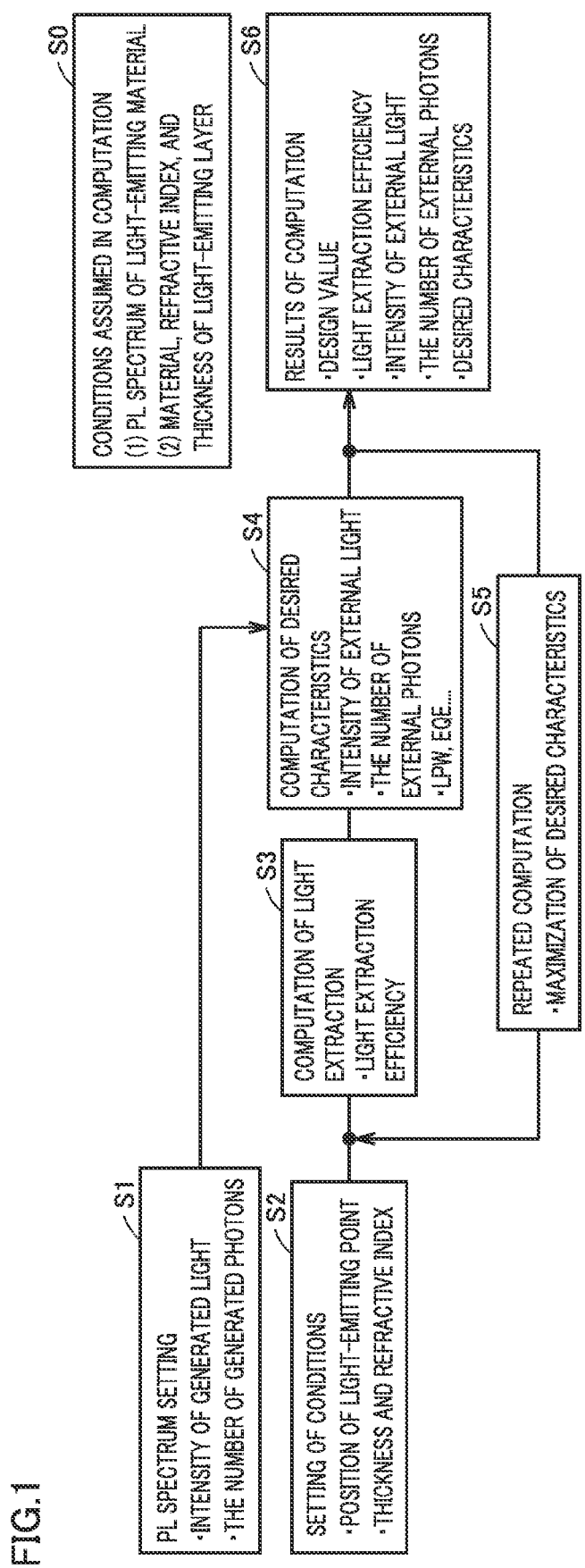
FIG. 1 is a block diagram showing a method of designing an electroluminescent device in the background art.

FIG. 1 shows a design method in PTDs 1 and 2 described above in a block diagram. Conditions assumed in computation include (1) a photoluminescence (PL) spectrum of a light-emitting material and (2) a material, a refractive index, and a thickness of a light-emitting layer (S0). In step 1 (S1), a PL spectrum is set based on intensity of generated light and the number of generated photons. In S2, conditions including a position of a light-emitting point, a thickness, and a refractive index are set. In S3, light extraction efficiency is computed. In S4, desired characteristics such as intensity of external light, the number of external photons, LPW (lumen/W), and external quantum efficiency (EQE) are computed based on results in S1 and S3. In order to achieve maximization of the desired characteristics, S3 and S4 are repeatedly performed (S5). Thereafter, in S6, when maximization of the desired characteristics is achieved, results of computation including a computed value, light extraction efficiency, intensity of external light, the number of external photons, and desired characteristics are obtained.

Thus, according to the design method described in PTDs 1 and 2, desired external characteristics are computed based on light extraction efficiency computed based on the PL spectrum of the light-emitting material alone and a refractive index and a thickness of the light-emitting layer. Computation based on the photoluminescence spectrum, however, cannot achieve accurate computation of an electroluminescence spectrum in an actual current injection state of a device due to a microcavity effect or a difference in characteristics between injection of electrons and photoexcitation. Though a spectrum in the light-emitting layer should be assumed in the method disclosed in NPD 1, detailed description as to how an internal spectrum is to be set to lessen an error between experiments and computation is insufficient.

Figure 2:
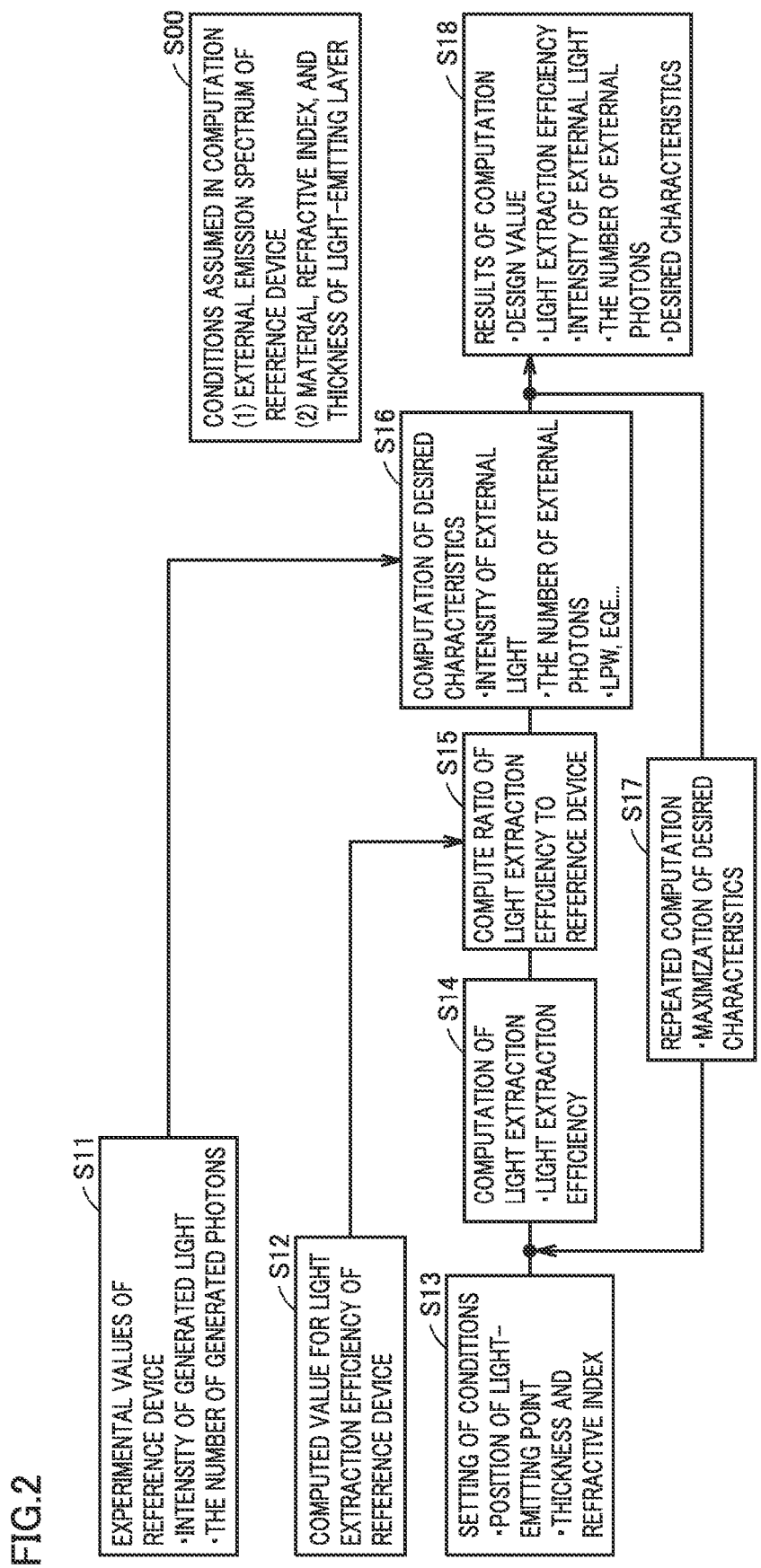
FIG. 2 is a block diagram showing overview of a method of designing an electroluminescent device in an embodiment.

FIG. 2 shows overview of a method of designing an electroluminescent device in the present embodiment in a block diagram. Conditions assumed in computation include (1) an external emission spectrum of a reference device and (2) a material, a refractive index, and a thickness of a light-emitting layer (S00). In step 11 (S11), an experimental value of the reference device is obtained based on intensity of generated light and the number of generated photons. In S12, a computed value of light extraction efficiency of the reference device is obtained. In step S13, conditions including a position of a light-emitting point, a thickness, and a refractive index are set. In S14, light extraction efficiency is computed. In S15, a ratio of light extraction efficiency to the reference device is computed based on the values and the conditions obtained in S12 and S14. In S16, desired characteristics such as intensity of external light, the number of external photons, LPW, and EQE are computed based on the experimental value and the ratio obtained in S11 and S15. In order to achieve maximization of the desired characteristics, S14, S15, and S16 are repeatedly performed (S17). Thereafter, in S18, when maximization of the desired characteristics is achieved, results of computation including a computed value, light extraction efficiency, intensity of external light, the number of external photons, and desired characteristics are obtained.

As described above, the present embodiment is a design method of computing an external emission spectrum of an analyzed device based on an electroluminescence spectrum actually externally measured in a reference device, light extraction efficiency calculated from an optical constant and a thickness of the reference device, and light extraction efficiency calculated from an optical constant and a thickness of the analyzed device. By using the design technique in the present embodiment, a method of designing an electroluminescent device allowing more accurate computation of an external emission spectrum output to the outside in a current injection state and accurate estimation of a quantity and/or a color of light extracted to the outside can be realized.

[2. Method of Designing Electroluminescent Device]

"2.1 Construction of Electroluminescent Device"

A construction of an electroluminescent device in the present embodiment will be described. Though an organic electroluminescent device will be described below by way of example, the present design method is not limited to design of an organic electroluminescent device but can be employed for design of a light-emitting diode (LED) composed of an inorganic material.

(First Electroluminescent Device)

A construction example of an "electroluminescent device having a plurality of functional layers lying between a transparent electrode and a second electrode and at least one emissive layer, a transparent member being in contact with a surface of the transparent electrode opposite to the emissive layer" as a first electroluminescent device will be described below with reference to FIGS. 3 to 7. FIGS. 3 to 7 are first to fifth cross-sectional views showing construction examples of the electroluminescent device in the present embodiment.

Figure 3:
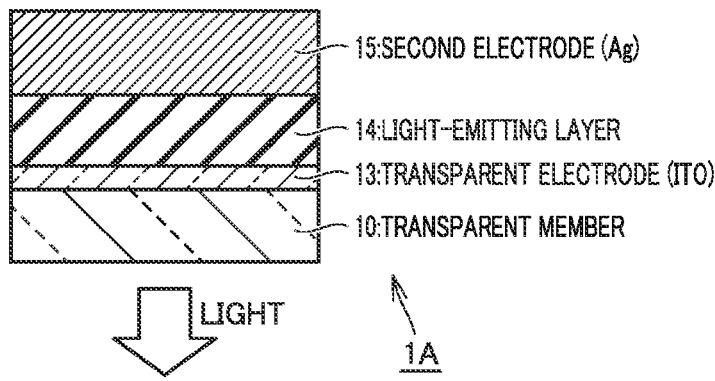
FIG. 3 is a first cross-sectional view showing a construction example of an electroluminescent device in an embodiment.

In an electroluminescent device 1A shown in FIG. 3, an indium tin oxide (ITO) electrode as a transparent electrode (first electrode) 13, a light-emitting layer 14, and a metal (Ag) reflective electrode as a second electrode 15 are formed on a first transparent member 10 in this order. Light-emitting layer 14 is constituted of a plurality of functional layers and an emissive layer, and a transparent glass substrate is employed for first transparent member 10.

Figure 4:
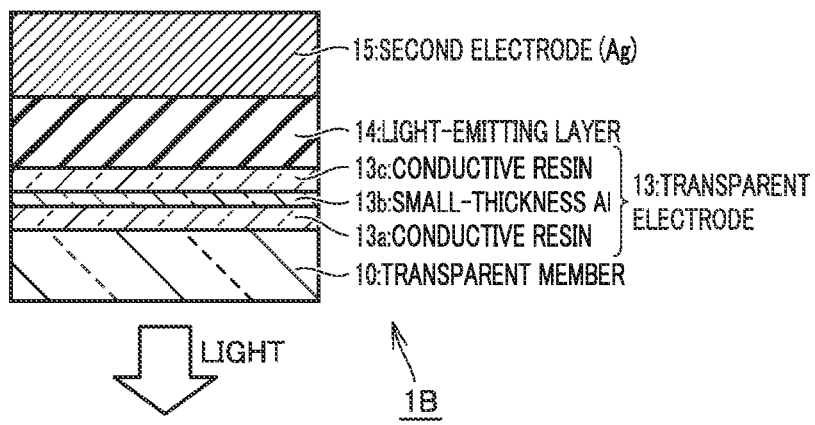
FIG. 4 is a second cross-sectional view showing a construction example of an electroluminescent device in an embodiment.

An electroluminescent device 1B shown in FIG. 4 includes a stack structure of a conductive resin 13a, small-thickness A1 (a small-thickness metal electrode) 13b, and a conductive resin 13c as transparent electrode (first electrode) 13 as compared with the construction of electroluminescent device 1A.

Figure 5:
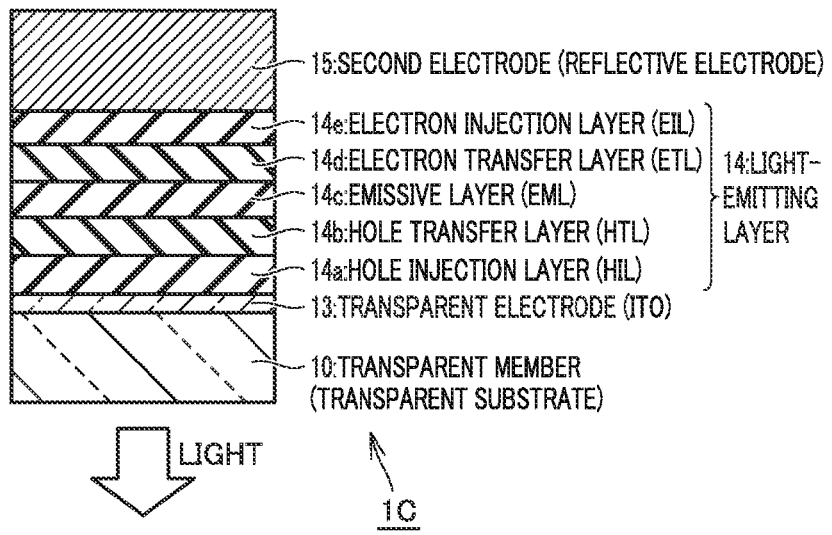
FIG. 5 is a third cross-sectional view showing a construction example of an electroluminescent device in an embodiment.

As compared with the construction of electroluminescent device 1A, in an electroluminescent device 1C shown in FIG. 5, light-emitting layer 14 is composed of an organic material, and for example, the light-emitting layer is constituted of a hole injection layer 14a, a hole transfer layer 14b, an emissive layer 14c, an electron transfer layer 14d, and an electron injection layer 14e. With such a construction with a large number of functional layers, carrier balance in emissive layer 14c can be improved and efficient light emission can be realized.

Figure 6:
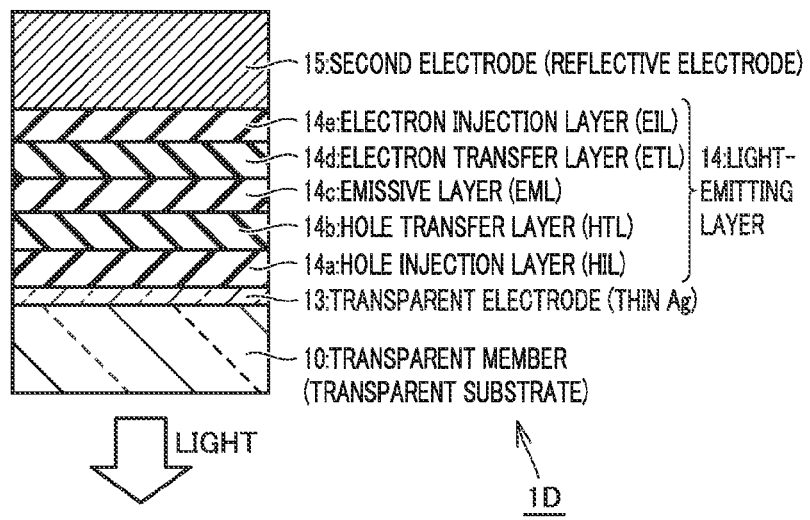
FIG. 6 is a fourth cross-sectional view showing a construction example of an electroluminescent device in an embodiment.

In an electroluminescent device 1D shown in FIG. 6, small-thickness Ag is used for transparent electrode 13, and a function and effect the same as in electroluminescent device 1C is obtained.

A metal (Ag) reflective electrode can be employed as second electrode 15 in both of electroluminescent device 1C and electroluminescent device 1D. Electroluminescent device 1C shown in FIGS. 5 and 6 is a bottom emission device.

Though a device having a functional layer formed on first transparent member 10 formed from the transparent substrate (a bottom emission device) is exemplified in FIGS. 3 to 6, the present embodiment is applied also to a construction in which a reflective electrode is provided on an opaque member (a top emission device).

Figure 7:
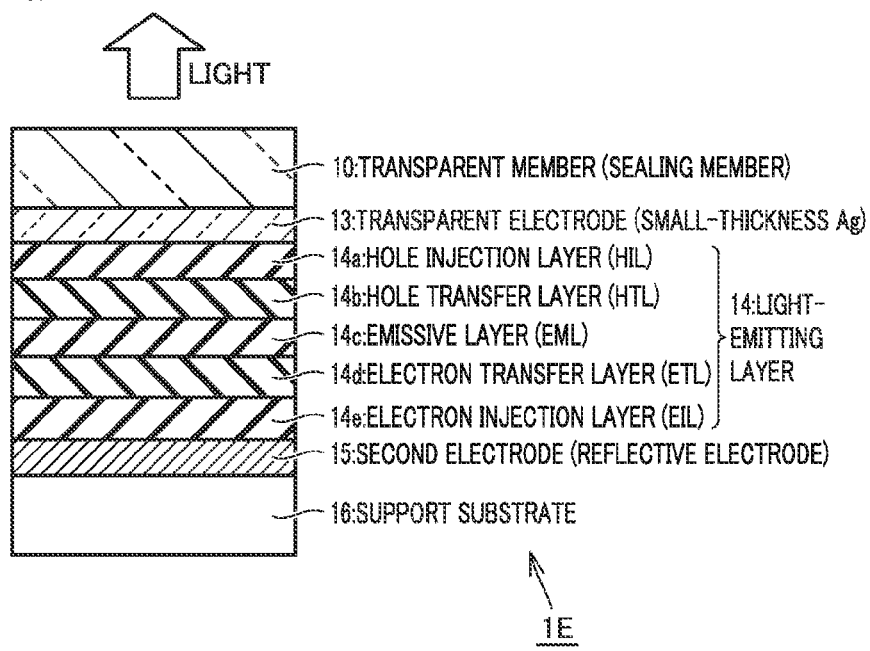
FIG. 7 is a fifth cross-sectional view showing a construction example of an electroluminescent device in an embodiment.

FIG. 7 shows an electroluminescent device 1E representing a construction example of a top emission device. A reflective electrode as second electrode 15 is provided on a support substrate 16, and light-emitting layer 14, small-thickness Ag as transparent electrode 13, and a sealing member as first transparent member 10 are formed on second electrode 15 in this order. Light-emitting layer 14 is constituted of electron injection layer 14e, electron transfer layer 14d, emissive layer 14c, hole transfer layer 14b, and hole injection layer 14a from a side of second electrode 15.

In the case of the top emission device, a transparent sealing member (first transparent member 10) or inert gas for sealing or air is provided on transparent electrode 13 in many cases. The transparent member in the present embodiment represents the sealing member or the inert gas or air.

(Second Electroluminescent Device)

Figure 8:
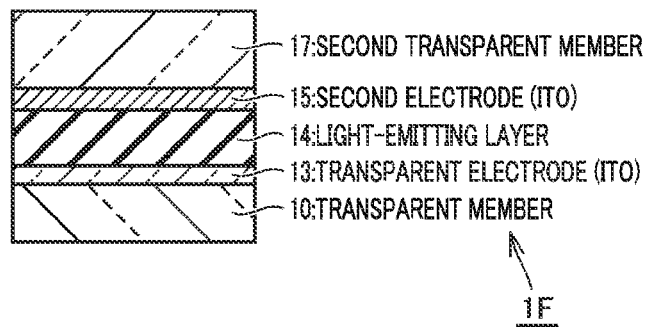
FIG. 8 is a sixth cross-sectional view showing a construction example of an electroluminescent device in an embodiment.
Figure 9:
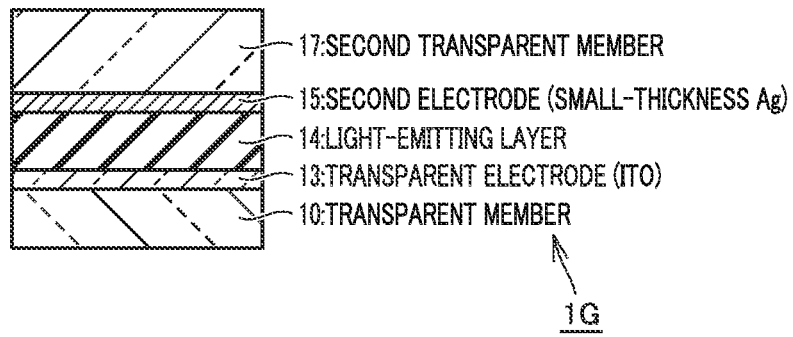
FIG. 9 is a seventh cross-sectional view showing a construction example of an electroluminescent device in an embodiment.
Figure 10:
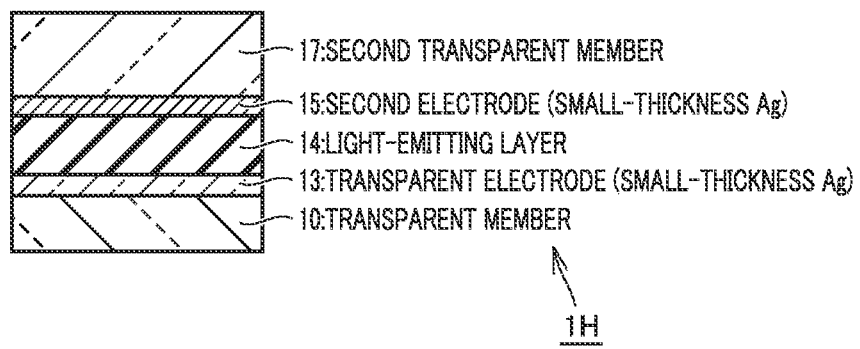
FIG. 10 is an eighth cross-sectional view showing a construction example of an electroluminescent device in an embodiment.

A construction example of an "electroluminescent device in which a second electrode is a transparent electrode and a second transparent member is provided on a side of the second electrode opposite to a side where the light-emitting layer is provided" as a second electroluminescent device will be described below with reference to FIGS. 8 to 10. FIGS. 8 to 10 are sixth to eighth cross-sectional views showing construction examples of the electroluminescent device in the present embodiment.

In an electroluminescent device 1F shown in FIG. 8, an ITO electrode as transparent electrode 13, light-emitting layer 14, an ITO electrode as second electrode 15, and a second transparent member 17 are formed on first transparent member 10 in this order. By adopting this construction, opposing surface sides are transparent and a transparent light-emitting device emitting light from opposing surfaces or one surface can be realized. Second transparent member 17 is formed, for example, of an ITO or from a small-thickness metal electrode. A material similar to that for first transparent member 10 is applicable to second transparent member 17.

In an electroluminescent device 1G shown in FIG. 9, a small-thickness metal film (Ag) is employed as second electrode 15 as compared with the construction of electroluminescent device 1F. With such a construction, a reflectance on the side of the second electrode when viewed from the light-emitting layer is higher than a reflectance of the transparent electrode when viewed from the light-emitting layer, and light emission biased to one side can be achieved.

In an electroluminescent device 1H shown in FIG. 10, as compared with the construction of electroluminescent device 1F, a small-thickness metal film (Ag) is employed for both of transparent electrode 13 and second electrode 15. With such a construction, a reflectance of both electrodes when viewed from the light-emitting layer can be increased, so that luminous efficiency can be improved or color purity can be enhanced owing to a microcavity effect.

(Third Electroluminescent Device)

Figure 11:
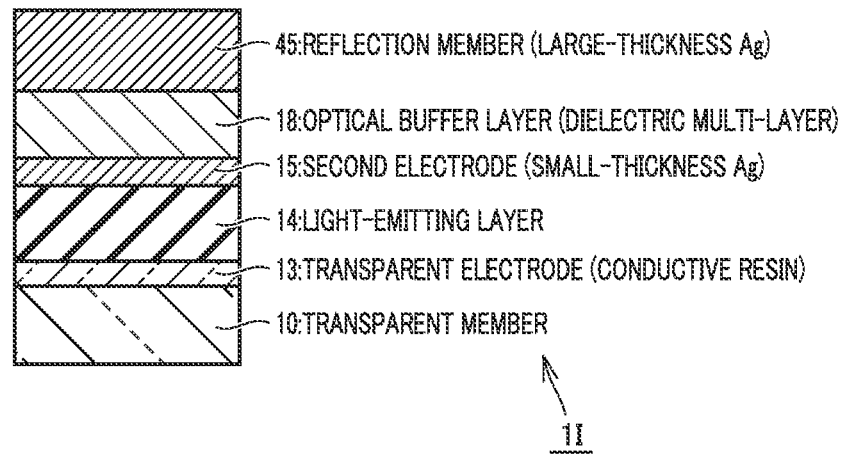
FIG. 11 is a ninth cross-sectional view showing a construction example of an electroluminescent device in an embodiment.
Figure 12:
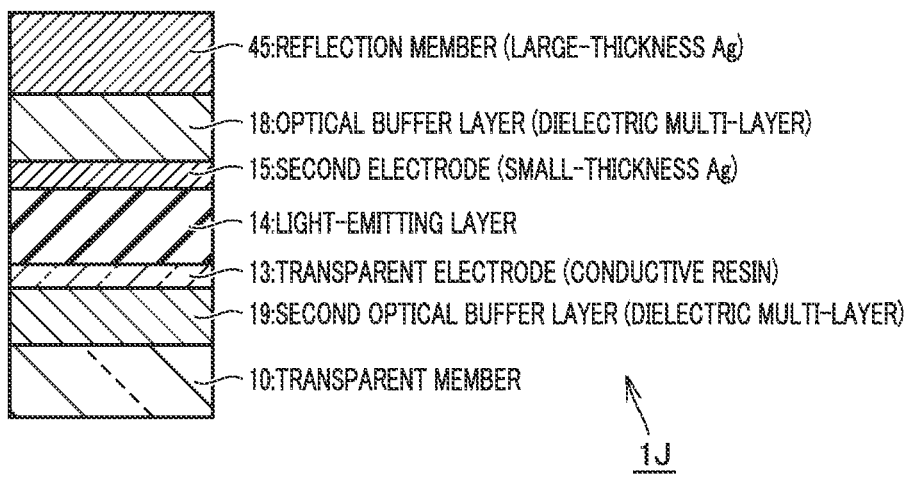
FIG. 12 is a tenth cross-sectional view showing a construction example of an electroluminescent device in an embodiment.
Figure 13:
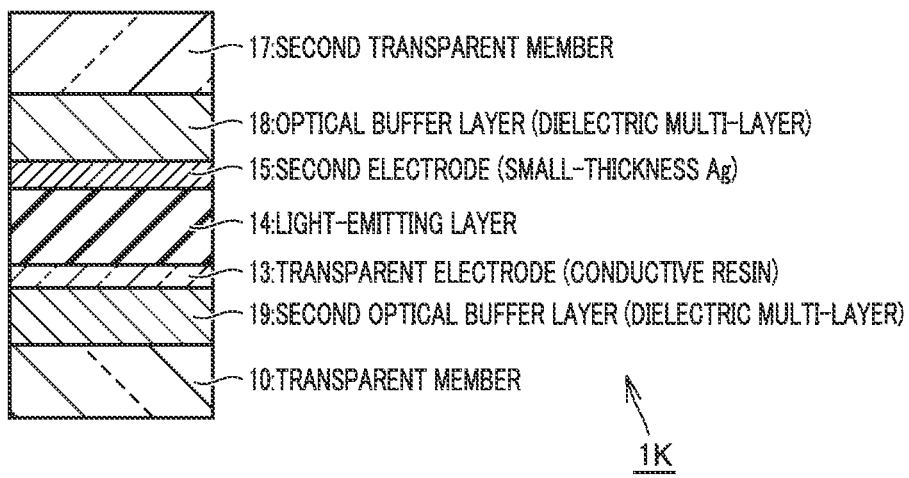
FIG. 13 is an eleventh cross-sectional view showing a construction example of an electroluminescent device in an embodiment.

A construction example of an "electroluminescent device having an optical multi-layer between the transparent electrode and the transparent member and/or between the second electrode and the second transparent member" as a third electroluminescent device will be described below with reference to FIGS. 11 to 13. FIGS. 11 to 13 are ninth to thirteenth cross-sectional views showing construction examples of the electroluminescent device in the present embodiment.

In an electroluminescent device 1I shown in FIG. 11, a conductive resin as transparent electrode 13, light-emitting layer 14, a small-thickness metal film (Ag) as second electrode 15, a dielectric multi-layer as an optical buffer layer 18, and a large-thickness metal film (Ag) as a reflection member 45 are formed on first transparent member 10 in this order. By adopting this construction, a color chromaticity or a distribution of light generated from the electroluminescent device can appropriately be controlled. Optical buffer layer 18 shown in FIG. 11 is applicable also to a transparent light-emitting device.

An electroluminescent device 1J shown in FIG. 12 has a dielectric multi-layer as a second optical buffer layer 19 between first transparent member 10 and transparent electrode 13 as compared with the construction of electroluminescent device 1I. By adopting such a construction, a color or a ratio of a luminance of light emitted from opposing surfaces and a light distribution in a single-emission light-emitting device can optically be designed.

An electroluminescent device 1K shown in FIG. 13 has a dielectric multi-layer as second optical buffer layer 19 between first transparent member 10 and transparent electrode 13 and has a second transparent member instead of a reflection member as compared with the construction of electroluminescent device 1I. By adopting such a construction, a color or a ratio of a luminance of light emitted from opposing surfaces and a light distribution in a dual-emission light-emitting device can optically be designed.

(Fourth Electroluminescent Device)

Figure 16:
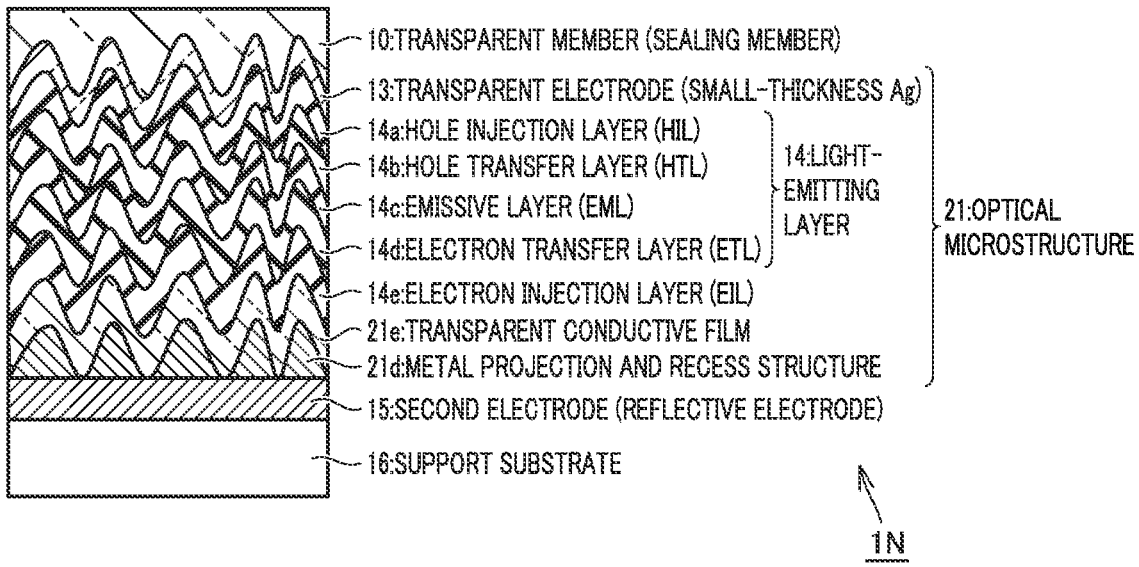
FIG. 16 is a fourteenth cross-sectional view showing a construction example of an electroluminescent device in an embodiment.

A construction example of an "electroluminescent device including an optical microstructure disturbing amplitude and a phase condition of light between the transparent member and the emissive layer" as a fourth electroluminescent device will be described below with reference to FIGS. 14 to 16. FIGS. 14 to 16 are twelfth to fourteenth cross-sectional views showing construction examples of the electroluminescent device in the present embodiment.

In an electroluminescent device 1L shown in FIG. 14, a first optical microstructure 21 including an internal scattering layer between first transparent member 10 and small-thickness Ag as transparent electrode 13 is provided as compared with the construction of the bottom emission device of electroluminescent device 1D shown in FIG. 6. First optical microstructure 21 has such a structure that a smooth layer 21c is provided on a layer where scattering particles as a light scattering layer 21b are held by a binder as a light scattering layer 21a. The microstructure is such that a thickness of light scattering layer 21b is comparable to a wavelength of light and a size of a scattering particle is equal to or smaller than several times as large as a wavelength of light. By adopting such a construction, a waveguide mode propagating in light-emitting layer 14 can efficiently be scattered.

In an electroluminescent device 1M shown in FIG. 15, first optical microstructure 21 is provided between second electrode 15 and electron injection layer 14e as compared with the construction of electroluminescent device 1E shown in FIG. 7. Microstructure 21 includes a metal projection and recess structure 21d and a transparent conductive film 21e.

In an electroluminescent device 1N shown in FIG. 16, the entire device on second electrode 12 except for first transparent member 10 is finely corrugated as compared with the construction of electroluminescent device 1M shown in FIG. 15. In particular, when the optical microstructure is provided on second electrode 12 serving as the reflective electrode, plasmon mode loss absorbed by the electrode can usefully be reduced. The optical microstructure described above may be provided in electroluminescent devices 1F to 1H representing the transparent light-emitting devices shown in FIGS. 8 to 10.

(Fifth Electroluminescent Device)

Figure 17:
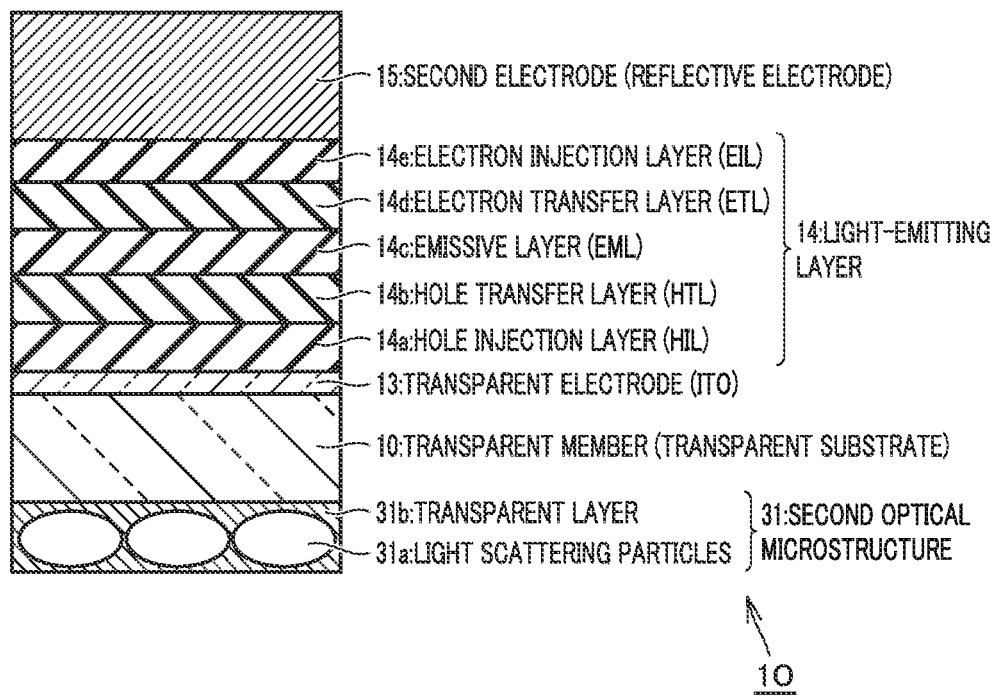
FIG. 17 is a fifteenth cross-sectional view showing a construction example of an electroluminescent device in an embodiment.

A construction example of an "electroluminescent device including a second optical microstructure disturbing amplitude and a phase condition of light at an interface between the transparent member and the outside" as a fifth electroluminescent device will be described below with reference to FIG. 17. FIG. 17 is a fifteenth cross-sectional view showing a construction example of the electroluminescent device in the present embodiment.

In an electroluminescent device 1O shown in FIG. 17, a second optical microstructure 31 is provided on first transparent member 10 as compared with the construction of the bottom emission device represented by electroluminescent device 1D shown in FIG. 6. A commercially available light extraction sheet can be employed as second optical microstructure 31. A specific structure includes a structure in which light scattering particles 31a are contained in a transparent layer 31b and a structure in which projections and recesses are located in a surface of a transparent member as illustrated. A structure constant in this case includes a height and a width of projections and recesses in a surface, a period of a unit structure, or a size, a density, and a shape of scattering particles.

Figure 18:
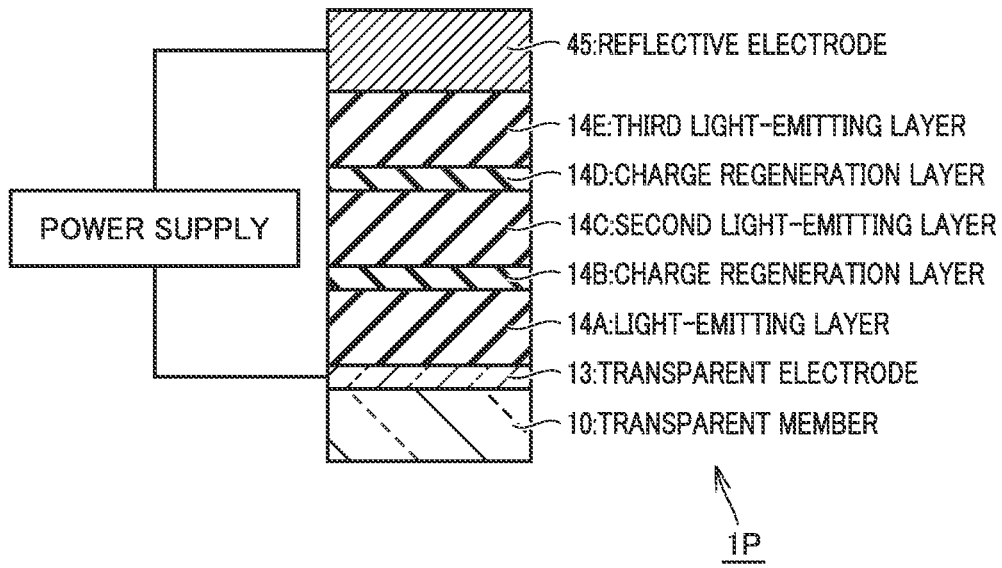
FIG. 18 is a sixteenth cross-sectional view showing a construction example of an electroluminescent device in an embodiment.

Though a light-emitting layer is formed from a single layer in first to fifth electroluminescent devices 1A to 1O above, the light-emitting layer may be formed from a plurality of layers without being limited to a single layer. FIG. 18 shows a construction example of an electroluminescent device 1P including a plurality of emissive layers. FIG. 18 shows a cross-sectional view of electroluminescent device 1P. In electroluminescent device 1P, transparent electrode 13, a light-emitting layer 14A, a charge regeneration layer 14B, a second light-emitting layer 14C, a charge regeneration layer 14D, a third light-emitting layer 14E, and reflective electrode 45 are stacked on transparent member 10 in this order. A power supply is connected between transparent electrode 13 and reflective electrode 45.

Such an electroluminescent device can generate more light with the same current and is suitable for an electroluminescent device high in efficiency. The method of designing an electroluminescent device in the present embodiment can be applied to such an electroluminescent device. In this case, a ratio of a light-emitting dopant in each light-emitting layer is desirably further included as a design variable. By applying the method of designing an electroluminescent device in the present embodiment, a device achieving a desired spectrum and high efficiency can efficiently be designed.

Figure 19:
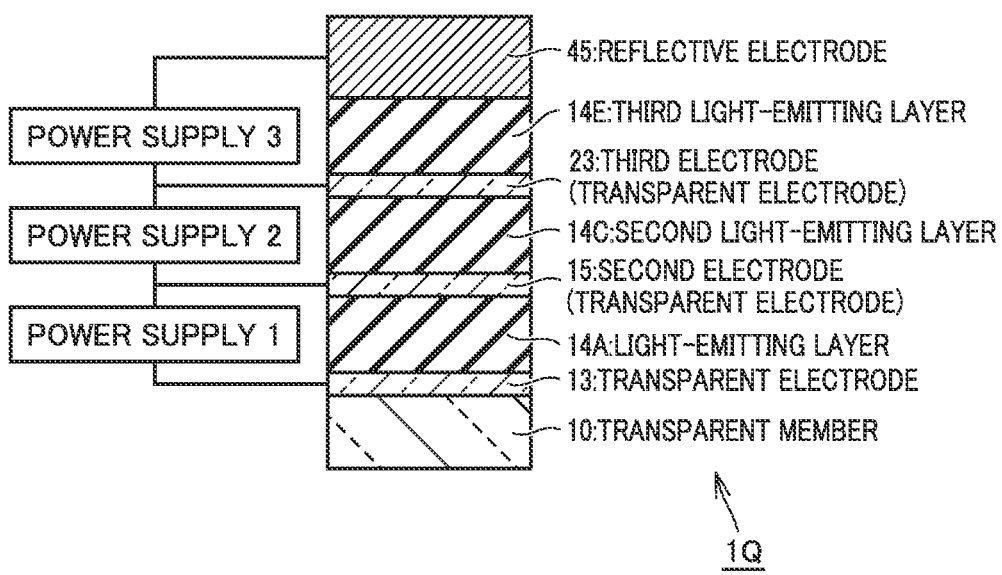
FIG. 19 is a seventeenth cross-sectional view showing a construction example of an electroluminescent device in an embodiment.

An electrode may be constructed such that a plurality of light-emitting layers can independently be driven. FIG. 19 shows an electroluminescent device 1Q constructed such that a plurality of light-emitting layers can independently be driven. FIG. 19 shows a cross-sectional view of electroluminescent device 1Q. In electroluminescent device 1Q, transparent electrode 13, light-emitting layer 14A, second electrode (transparent electrode) 15, second light-emitting layer 14C, a third electrode (transparent electrode) 23, third light-emitting layer 14E, and reflective electrode 45 are stacked on transparent member 10 in this order. A power supply 1 is connected between transparent electrode 13 and second electrode (transparent electrode) 15, a power supply 2 is connected between second electrode (transparent electrode) 15 and third light-emitting layer 14E, and a power supply 3 is connected between third electrode (transparent electrode) 23 and reflective electrode 45. With such a construction, an electroluminescent device emitting light of any color can be realized.

Figure 20:
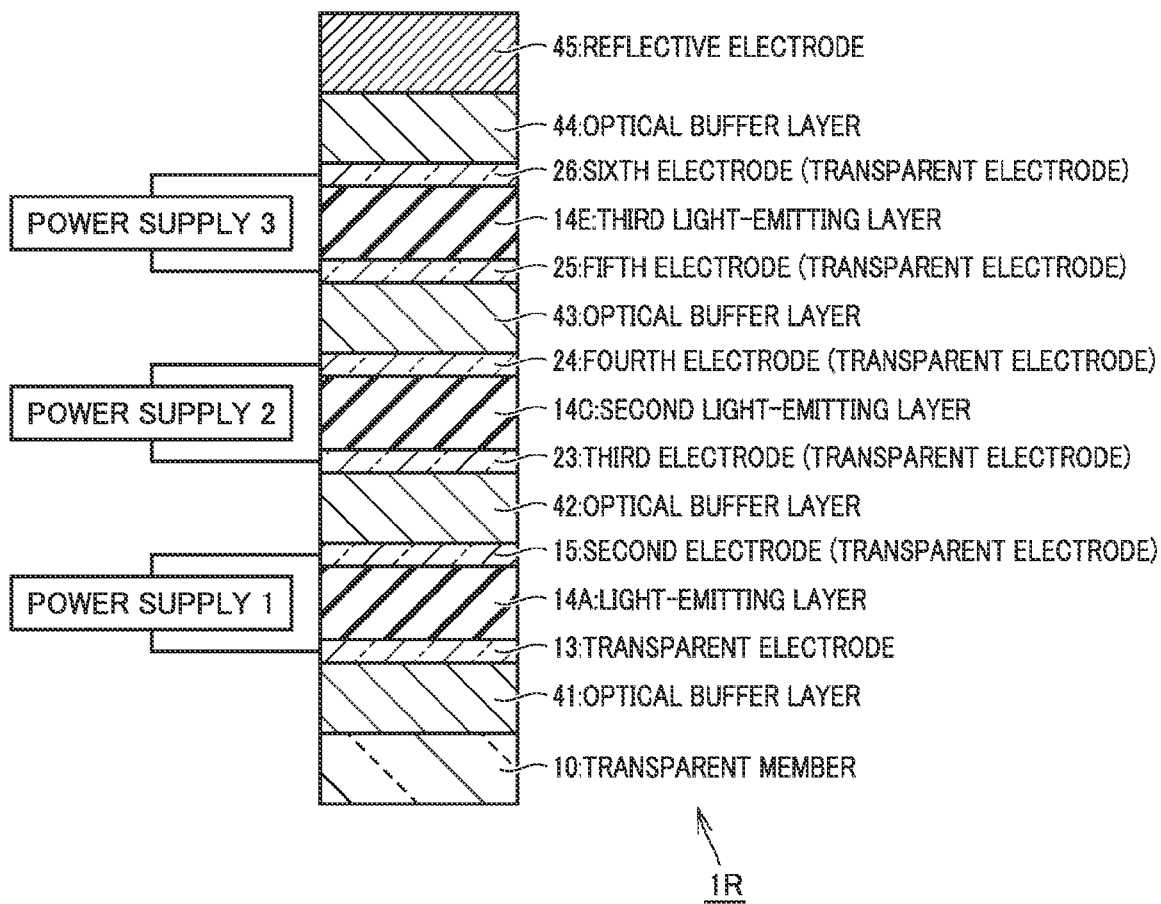
FIG. 20 is an eighteenth cross-sectional view showing a construction example of an electroluminescent device in an embodiment.

An optical buffer layer may be included between a plurality of emissive layers as in FIG. 20. FIG. 20 shows a cross-sectional view of an electroluminescent device 1R. In electroluminescent device 1R, an optical buffer layer 41, transparent electrode 13, light-emitting layer 14A, second electrode (transparent electrode) 15, an optical buffer layer 42, third electrode (transparent electrode) 23, second light-emitting layer 14C, a fourth electrode (transparent electrode) 24, an optical buffer layer 43, a fifth electrode (transparent electrode) 25, third light-emitting layer 14E, a sixth electrode (transparent electrode) 26, an optical buffer layer 44, and reflective electrode 45 are stacked on transparent member 10 in this order. Power supply 1 is connected between transparent electrode 13 and second electrode (transparent electrode) 15, power supply 2 is connected between third electrode (transparent electrode) 23 and fourth electrode (transparent electrode) 24, and power supply 3 is connected between fifth electrode (transparent electrode) 25 and sixth electrode (transparent electrode) 26.

With such a construction, a spectrum of emitted light or a light distribution can arbitrarily be controlled. When such an optical buffer layer includes a microcavity adapted to a specific wavelength, a rate of light emission at the specific wavelength can be increased. By applying the method of designing an electroluminescent device in the present embodiment with an optical buffer layer also being included, a construction for realizing an electroluminescent device high in emission intensity at a desired wavelength and at a desired angle can efficiently be designed.

Though description has been given so far by way of example of a single-emission light-emitting device, the construction including a plurality of light-emitting layers may be applicable to a dual-emission light-emitting device. In this case, an electroluminescent device which emits light on opposing sides and achieves high efficiency or a desired spectrum can efficiently be designed.

"2.2 Details of Constituent Members"

Details of various members (materials) forming electroluminescent devices 1A to 1N described above will be described below.

(First Transparent Member 10/Second Transparent Member 17)

A material which can be used for first transparent member 10 or second transparent member 17 will be exemplified. For example, glass or plastic can be exemplified, however, limitation thereto is not intended. Examples of a preferably used transparent member can include glass, quartz, and a transparent resin film.

Examples of glass include silica glass, soda lime silica glass, lead glass, borosilicate glass, and alkali free glass. From a point of view of adhesion to a scattering layer, durability, and smoothness, a surface of such a glass material may be subjected to a physical treatment such as polishing as necessary, or a coating composed of an inorganic substance or an organic substance or a hybrid coating which is a combination of these coatings can be formed on a surface of the glass material.

Examples of the resin film include polyester such as polyethylene terephthalate (PET) and polyethylene naphthalate (PEN), polyethylene, polypropylene, cellulose esters or derivatives thereof such as cellophane, cellulose diacetate, cellulose triacetate (TAC), cellulose acetate butyrate, cellulose acetate propionate (CAP), cellulose acetate phthalate, and cellulose nitrate, polyvinylidene chloride, polyvinyl alcohol, polyethylene vinyl alcohol, syndiotactic polystyrene, polycarbonate, a norbornene resin, polymethylpentene, polyether ketone, polyimide, polyether sulfone (PES), polyphenylene sulfide, polysulfones, polyetherimide, polyether ketone imide, polyamide, a fluorine resin, nylon, polymethyl methacrylate, acrylic or polyarylates, and a cycloolefin based resin such as Arton® (trademark manufactured by JSR Corporation) or Apel™ (trademark manufactured by Mitsui Chemicals, Inc.). A coating composed of an inorganic substance or an organic substance or a hybrid coating which is a combination of these coatings may be formed on the surface of the resin film.

Such a coating and a hybrid coating are each preferably a gas barrier film (also called a barrier film) having a water vapor permeability (25±0.5° C., relative humidity 90±2% RH) not higher than 0.01 g/(m²·24 h) measured with a method in conformity with JIS K 7129-1992. Furthermore, the coating and the hybrid coating are each preferably a high gas barrier film having an oxygen permeability not higher than $1\times10^{-3}$ ml/(m²·24 h·atm) and a water vapor permeability not higher than $1\times10^{-5}$ g/(m²·24 h) which are measured with a method in conformity with JIS K 7126-1987.

A material having a function to suppress entry of a substance bringing about deterioration of a device, such as moisture or oxygen, should only be adopted as a material for forming the gas barrier film as above, and for example, silicon oxide, silicon dioxide, or silicon nitride or polysilazane described previously can be employed. Furthermore, in order to overcome weakness of the gas barrier film, a stack structure of such an inorganic layer and a layer composed of an organic material (an organic layer) is more preferably provided. Though an order of stack of the inorganic layer and the organic layer is not particularly restricted, they are preferably alternately stacked a plurality of times.

A method of forming a gas barrier film is not particularly limited, and for example, vacuum vapor deposition, sputtering, reactive sputtering, molecular beam epitaxy, cluster ion beam, ion plating, plasma polymerization, atmospheric plasma polymerization, plasma CVD, laser CVD, thermal CVD, or coating can be employed. Atmospheric plasma polymerization described in Japanese Laid-Open Patent Publication No. 2004-68143 or a method of reforming polysilazane (-containing liquid) by irradiating the same with vacuum ultraviolet rays having a wavelength from 100 to 230 nm is particularly preferred.

Japanese Laid-Open Patent Publication No. 2004-68143 describes formation of a thin film with a thin film formation method using an atmospheric pressure plasma discharge treatment apparatus, by application by the second electrode of high-frequency electric field of which output density is not lower than 1 W/cm² with relation of V1≥IV>V2 or V1>IV≥V2 being satisfied, where V1 represents intensity (kV/mm) of high-frequency electric field applied by the first electrode, V2 represents intensity (kV/mm) of high-frequency electric field applied by the second electrode, and IV represents intensity (kV/mm) of electric field at the time of start of discharging.

A thickness and a complex relative permittivity of a member are included as design variables in the present embodiment in connection with the transparent member. The complex relative permittivity is computed from a refractive index and an extinction coefficient using an expression (3) which will be described later, and when there is a birefringence, it is defined as a tensor quantity having components in directions of axes in three-dimension.

(Transparent Electrode 13/Second Electrode 15)

A material used for transparent electrode 13 or second electrode 15 will be exemplified. For transparent electrode 13, in particular a transparent small-thickness metal having an effect to lower an effective refractive index of the waveguide mode and to facilitate scattering of the waveguide mode in the light scattering layer is desirable. A transparent small-thickness metal layer is a small-thickness film which is composed of a small-thickness metal and allows passage of light therethrough. How thin the transparent small-thickness metal layer should be in order to allow passage of light therethrough can be expressed with an imaginary part of an refractive index. Phase variation φ and a transmittance T at the time of passage through a medium having a thickness d [m] can be expressed in an expression (1) below with an refractive index n and an extinction coefficient κ.

$$\phi = n\frac{2\pi}{\lambda}d \quad (1)$$

$$T = \exp\left(-\kappa\frac{4\pi}{\lambda}d\right)$$

In the expression, λ represents a wavelength of light in vacuum. Based on the expression (1), a distance $L_d$ at which intensity of light is attenuated to $1/e^2$ can be expressed in an expression (2) below.

$$L_d = \frac{\lambda}{2\pi\kappa} \quad (2)$$

In order to have a sufficient transmittance, the transparent small-thickness metal layer is desirably smaller in thickness than $L_d$ shown in the expression (2).

A transparent dielectric layer is a layer composed of a dielectric. Definition of a dielectric will be described below. Whether a substance is a metal containing many free electrons through which much light does not pass or a dielectric containing few free electrons through which light passes can be examined by using a complex relative permittivity. A complex relative permittivity $\in_c$ represents an optical constant associated with interface reflection, and it represents a physical quantity expressed with refractive index n and extinction coefficient γ in an expression (3) below.

$$\in_c = (n^2 - \kappa^2) + 2in\kappa$$

$$P = (\in_c - \in_o)E \quad (3)$$

P and E represent polarization and electric field, respectively, and $\epsilon_o$ represents a permittivity in vacuum. It can be seen from the expression (3) that as n is smaller and κ is greater, a real part of the complex relative permittivity is smaller. This represents an effect of phase shift from oscillation of electric field, of polarization response due to oscillation of electrons.

The negative real part of the complex relative permittivity expressed in the expression (3) means that electric field oscillation and polarization response are reversed, which represents characteristics of the metal. In contrast, when the real part of the complex relative permittivity is positive, a direction of electric field and a direction of polarization response match with each other and polarization response as a dielectric is exhibited. In summary, a medium of which real part of a complex relative permittivity is negative is a metal, and a substance of which real part of the complex relative permittivity is positive is a dielectric.

In general, a lower refractive index n and a greater extinction coefficient κ mean a material of which electrons well oscillate. A material high in electron transferability tends to be low in refractive index n and great in extinction coefficient κ.

In particular, a metal electrode has n around 0.1 whereas it has a large value for extinction coefficient κ from 2 to 10, and it is also high in rate of change with a wavelength. Therefore, even when a value for refractive index n is the same, a value for extinction coefficient κ is significantly different, and there is a great difference in performance in transfer of electrons in many cases.

In carrying out the present embodiment, a metal low in refractive index n for lowering in effective refractive index of the waveguide mode and high in extinction coefficient κ for improvement in response of electrons is desirable. For example, aluminum (Al), silver (Ag), and calcium (Ca) are desirable. In other examples, gold (Au) which is also advantageously less prone to oxidization is possible. Another material is exemplified by copper (Cu), and this material is high in conductivity. Other materials which have good thermal properties or chemical properties, are less prone to oxidization even at a high temperature, and do not chemically react with a material for a substrate include platinum, rhodium, palladium, ruthenium, iridium, and osminium. An alloy containing a plurality of metal materials may be employed. In particular, MgAg or LiAl is often used for a small-thickness transparent metal electrode.

For a transparent electrode in a transparent electrode layer, in addition to a transparent oxide semiconductor, a conductive resin which can be produced at low cost with an application method may be employed. A perylene derivative or a fullerene derivative such as [6,6]-phenyl-C61-butyric acid methyl ester (PCBM) is available as a conductive resin material used for an electron transfer electrode. For example, in a case of PCBM, an optical constant of visible light is refractive index n=2.2 and extinction coefficient κ=0.25 and a reflectance of an electrode viewed from the light-emitting layer is higher than that of a resin having refractive index n=1.5.

Examples of a conductive resin material used for a hole transfer electrode include poly(3,4-ethylenedioxythiophene) (PEDOT)/poly(4-styrenesulfonate) (PSS), poly(3-hexylthiophene) (P3HT), poly(3-octylthiophene) (P3OT), poly(3-dodecylthiophene-2,5-diyl) (P3DDT), and a copolymer of fluorene and bithiophene (F8T2). For example, in a case of PEDOT/PSS, an optical constant of visible light is refractive index n=1.5 and extinction coefficient κ=0.01, and a reflectance of an electrode viewed from the light-emitting layer has a value comparable to that of a resin having an refractive index n=1.5 and the reflectance is relatively lower than that of PCBM.

In order to enhance electrical conductivity of the transparent electrode layer, a metal mesh, a metal nanowire, or metal nanoparticles may be used together. In this case, with higher electron conductivity of an electrode including a metal nanowire, an average refractive index tends to be lower and a reflectance viewed from the light-emitting layer tends to be high. In carrying out the present embodiment, light of which waveguide mode has been scattered by a material for the transparent electrode low in reflectance viewed from the light-emitting layer can efficiently be extracted into the transparent substrate, which is desirable. When a metal mesh, a metal nanowire, or metal nanoparticles is (are) used, an effect of extraction to the outside by scattering of the waveguide mode by the electrode itself is also achieved, which is desirable in realizing a light-emitting device high in efficiency.

A thickness and a complex relative permittivity of a member are included as design variables in the present embodiment in connection with the transparent electrode. The complex relative permittivity is computed from a refractive index and an extinction coefficient using the expression (3), and when there is a birefringence, it is defined as a tensor quantity having components in directions of axes in three-dimension. When the transparent electrode is formed from a plurality of members, a variable for determining a structure of each member and a complex relative permittivity are included as design variables. For example, in the case of a metal mesh electrode, a height or a width of the mesh, a period, a material, and a combination of materials may be included as design variables.

(Emissive Layer 14c/Functional Layer)

When an organic material is used for emissive layer 14c or the functional layer, the material typically has a refractive index between 1.6 and 1.8 in a visible light range. From a point of view of preferably obtaining improvement in external extraction quantum efficiency of a device or longer life of light emission, an organic metal complex as a material for an organic EL device is preferably used as a material for the emissive layer. Furthermore, a metal involved with formation of a complex is preferably any one metal belonging to group VIII to group X in the periodic table, Al, or Zn, and particularly preferably, the metal is Ir, Pt, Al, or Zn.

A thickness and a complex relative permittivity of a member are included as design variables in the present embodiment in connection with the emissive layer. The complex relative permittivity is computed from a refractive index and an extinction coefficient using the expression (3), and when there is a birefringence, it is defined as a tensor quantity having components in directions of axes in three-dimension. When the emissive layer is formed from a plurality of members, a variable for determining a structure of each member and a complex relative permittivity are included as design variables.

(Reflective Electrode (Second Electrode) 15)

A metal material exemplified as a material for the transparent small-thickness metal layer can be employed as a material for the reflective electrode. Other alloys and an ink containing metal nanoparticles may be employed. In addition, a transparent electrode and a dielectric multi-layer mirror, a metal projection and recess structure, or a photonic crystal may be used in combination with a reflection layer. When the dielectric multi-layer mirror, the metal projection and recess structure, or the photonic crystal is used for a reflection layer, plasmon loss in the reflection layer is advantageously eliminated.

A thickness and a complex relative permittivity of a member are included as design variables in the present embodiment in connection with the reflective electrode. The complex relative permittivity is computed from a refractive index and an extinction coefficient using the expression (3), and when there is a birefringence, it is defined as a tensor quantity having components in directions of axes in three-dimension. When the reflective electrode is formed from a plurality of members, a variable for determining a structure of each member and a complex relative permittivity are included as design variables.

(Optical Buffer Layer)

A photonic crystal structure in addition to the dielectric multi-layer can be employed for the optical buffer layer. In order to fabricate the dielectric multi-layer or the photonic crystal structure, materials having a plurality of permittivities should be combined, and the dielectric materials are desirably transparent at a wavelength at which light is generated in the emissive layer. A material used for the transparent member can be made use of as a transparent material. Specific materials can include $TiO_2$ (having refractive index n=2.5) and $SiO_x$ (having refractive index n=1.4 to 3.5). Other examples of the dielectric materials can include diamond, calcium fluoride (CaF), and silicon nitride ($Si_3N_4$).

Examples of a resin material include vinyl chloride, acrylic, polyethylene, polypropylene, polystyrene, ABS, nylon, polycarbonate, polyethylene terephthalate, polyvinylidene fluoride, Teflon™, polyimide, and a phenol resin, and there are also resin materials having a refractive index from 1.4 to 1.8. There is also a technique to control a refractive index to be higher or lower by mixing nanoparticles, and a refractive index of a plastic material in which hollow nano silica is mixed can be closer to 1. A refractive index close to 2 can also be realized by mixing particles of a material high in refractive index such as $TiO_2$ into a resin.

A thickness and a complex relative permittivity of a member forming a buffer layer are included as design variables in the present embodiment in connection with the optical buffer layer. The complex relative permittivity is computed from a refractive index and an extinction coefficient using the expression (3), and when there is a birefringence, it is defined as a tensor quantity having components in directions of axes in three-dimension. When the optical buffer layer is formed from a plurality of members, a variable for determining a structure of each member and an optical constant are included as design variables. For example, when the optical buffer layer is formed from a dielectric multi-layer, a thickness and a complex relative permittivity of each optical thin film forming the dielectric multi-layer may be included as design variables. When the optical buffer layer is formed, for example, of photonic crystals, a dielectric structure of a unit lattice of photonic crystals and a complex relative permittivity of a material forming the unit lattice may be included as design variables.

(Optical Microstructure)

Examples of the optical microstructure include a layer containing scattering particles, a layer having a projection and recess structure, and such a structure that a light-emitting layer as a whole has a corrugated structure. In any case, design variables include a variable for determining a size or a shape of the structure and a complex relative permittivity of each structure. The complex relative permittivity is computed from a refractive index and an extinction coefficient using the expression (3), and when there is a birefringence, it is defined as a tensor quantity having components in directions of axes in three-dimension.

"2.3 Method of Computing Light Extraction Efficiency and Various Characteristics of External Light"

A method of computing light extraction efficiency in the present embodiment will be described in the present section. Light extraction efficiency refers to the number of photons extracted into a transparent member or air when the number of photons generated in an emissive layer is defined as 1. Though a computation method disclosed on PTDs 1 and 2 shown in the background art (hereinafter referred to as the computation method in the background art) can be employed for a specific computation method, the computation method in the background art and the computation method in the present embodiment are different from each other in two points below.

A first difference between the computation method in the background art and the computation method in the present embodiment is "calculating 'a ratio of light extraction efficiency' between a reference device and an analyzed device by computing efficiency in light extraction from an emissive layer into a transparent member or air in both of the reference device and a desired analyzed device and finding relation of a thickness and a complex relative permittivity of each of the layers forming the reference device and the analyzed device with the 'ratio of light extraction efficiency.'" Thus, a difference between a photoluminescence spectrum and an electroluminescence spectrum caused by injection of electrons or the microcavity effect in experiments can be corrected by the experiments.

A second difference between the computation method in the background art and the computation method in the present embodiment is performing "quantum optical analysis." Characteristics to which attention is paid in the present embodiment are various characteristics of external light at the time of injection of electrons. Though the computation method in the background art does not provide description, internal quantum efficiency should be found based on quantum optical analysis in order to compute characteristics at the time of injection of electrons. In general, change in light emission rate owing to the microcavity effect is computed, and precise computation is carried out by solving a rate equation involved with radiative recombination. For the sake of brevity, an example in which only radiative recombination and non-radiative recombination are present will be described here. A rate equation involved with radiative recombination is written as in an expression (4) below, where $k_r$ represents a radiative recombination rate and $k_{nr}$ represents a non-radiative recombination rate.

$$\frac{dN_{exc}}{dt} = -(k_r + k_{nr})N_{exc} + N_{inj} \tag{4}$$

In the expression, $N_{exc}$ represents a density of exciters in the emissive layer and $N_{inj}$ represents a density of injection of exciters. Since temporal differentiation is zero in a steady state, ultimately, an expression (5) below holds.

$$N_{inj} = (k_r + k_{nr})N_{exc} \Rightarrow N_{exc} = \frac{N_{inj}}{k_r + k_{nr}} \tag{5}$$

$$\Gamma_{rad} = k_r N_{exc} \quad \Gamma_{nr} = k_{nr} N_{exc}$$

A probability φ of radiative recombination is computed as in an expression (6) below.

$$\phi = \frac{\Gamma_{rad}}{\Gamma_{rad} - \Gamma_{nr}} = \frac{k_r}{k_r + k_{nr}} \quad (6)$$

A radiative recombination rate can be computed by combining emission lifetime specific to a material with the computation method disclosed in NPD 1. In addition, a radiative recombination rate can be analyzed by combining emission lifetime specific to a material with a finite-difference time-domain (FDTD) method or a transfer matrix method representing existing electromagnetic field analysis techniques. In particular, in computation of a radiative recombination rate, a Purcell factor disclosed in NPD 1 is desirably included in a result of computation.

A guideline for more accurate computation is shown below. Since kr is dependent on a structure of a device and an emission wavelength, weighting computation is desirably carried out also in consideration of dependency on a structure of a device and dependency on a wavelength. In the case of an organic electroluminescent device, more accurate analysis is performed by incorporating an effect of excited triplet deactivation or singlet-triplet deactivation into the rate equation, and a correction factor for "light extraction efficiency" is computed.

Finally, the number of photons extracted to the outside (external quantum efficiency: EQE) standardized by the number of injected electrons is computed as in an expression (7).

$$EQE = \gamma_e \times \phi \times \eta_{OE} \quad (7)$$

In the expression, $\gamma_e$ represents efficiency in conversion from an electron into an exciter determined under spin injection rules, φ represents a probability of radiative recombination, and $\eta_{OE}$ represents "efficiency of light extraction" into a transparent member or air and it is a value including quantum optical analysis.

The overall specific computation method will be shown below. Dependency $\eta_0$ (λ) on a wavelength of light extraction efficiency of the reference device and light extraction efficiency $\eta_1$ (λ) of the analyzed device are computed by combining the computation method in the background art (the existing analysis technique) and quantum optical computation. $S_0$ (λ) represents a whole-angle optical spectrum in air of the reference device measured in experiments. A whole-angle spectrum $S_1$ (λ) in air of the analyzed device is computed in an expression (8) below.

$$S_1(\lambda) = \frac{\eta_1(\lambda)}{\eta_0(\lambda)} S_o(\lambda) \quad (8)$$

Thereafter, a front spectrum $S_{front}$ (λ) of the analyzed device is calculated as in an expression (9) below, based on a ratio $G_{front}$ (λ) between the whole-angle spectrum in air found in computation and a front spectrum in air.

$$S_{front}(\lambda) = G_{front}(\lambda) S_1(\lambda) = G_{front}(\lambda) \frac{\eta_1(\lambda)}{\eta_0(\lambda)} S_o(\lambda) \quad (9)$$

This is also applicable to spectra at other angles. An expression (10) below holds where $G_{ang}(\lambda, \theta)$ represents a ratio between the whole-angle spectrum in air found in computation and an angle spectrum.

$$S_{ang}(\lambda, \theta) = G_{ang}(\lambda, \theta) S_1(\lambda) = G_{ang}(\lambda, \theta) \frac{\eta_1(\lambda)}{\eta_0(\lambda)} S_o(\lambda) \quad (10)$$

A color coordinate or a luminous flux [lm] after a desired spectrum is found can be computed under the definition by CIE.

This computation method is applicable not only to the whole-angle spectrum in air but also to a whole-angle spectrum in the inside of a transparent member. Specifically, a method of conducting measurement with the use of an integrating sphere by bringing a hemispherical lens sufficiently larger than a light emitting region into intimate contact with a transparent member with the use of a matching oil is available as a method of finding a whole-angle spectrum in the inside of the transparent member in experiments.

"2.4 Technique of Optimization Computation"

A desirable method of optimization computation will be described with reference to FIG. 2. External quantum efficiency, an emission luminance, and a color coordinate are computed by computing an external spectrum with the method described in "2.3 Method of Computing Light Extraction Efficiency and Various Characteristics of External Light" for each design variable of the electroluminescent device.

Briefly speaking, a method of achieving a desired color coordinate or efficiency by performing exhaustive computation in a desired range of design variables is possible. In this case, many levels are efficiently computed with fewer levels based on computation under a design-of-experiments method. Efficiency in computation is high if each level is subjected to parallel computation by a plurality of cluster machines. Parallel computation using a graphic processor is desirable for acceleration of computation.

Combination with optimization computation is desirable. An optimization algorithm is desirably combined with a steepest descent method, a conjugate gradient method, a linear programming method, or a genetic algorithm relating to desired characteristics. In optimization, optimization in consideration of robustness is desirably performed. A technique to perform computation a plurality of times for design variables around a certain level, evaluate a level based on magnitude of variation in desired characteristics, and select a level less in variation is desirable as a specific method of computing robustness.

[3. Details of Design Method]

"3.1 Overview"

FIG. 21 shows a procedure of the design method in the present embodiment. This design technique is constituted of a section R100 in which current drive characteristics and analysis of the reference device are mainly performed and an optimization loop 200 for the analyzed device. A design method of an essential part of the design method in the present embodiment will be described below.

Section R100 where current drive characteristics and analysis are performed determines design variables of a reference device based on a thickness, a complex relative permittivity, and a structure constant (S110). Thereafter, a reference device is fabricated (S120). Then, measurement of the reference device is conducted (S130). Specifically, an electroluminescence spectrum in current drive is measured, and external quantum efficiency in current drive is measured. A result of measurement of the reference device is input to S250 in optimization loop R200 which will be described later.

Computation of the reference device is performed (S140) based on determination of the design variables of the reference device (S110). Specifically, computation of the reference device is performed by using quantum optical analysis, electromagnetic field analysis, and ray trace. A result of computation of the reference device is input to S240 in optimization loop R200 which will be described later.

In optimization loop R200, design variables of the analyzed device are determined based on a thickness, a complex relative permittivity, and a structure constant (S210). Thereafter, computation of the analyzed device is performed (S220). Specifically, computation of the analyzed device is performed by using quantum optical analysis, electromagnetic field analysis, and ray trace.

Then, results of computation of the analyzed device are obtained (S230). Specifically, results of computation of dependency on a wavelength of a relative light emission rate, dependency on a wavelength of light extraction efficiency, and dependency on a wavelength and an angle of intensity of light emission of the device are obtained.

Then, a ratio of emission intensity between the analyzed device and the reference device is computed based on the results of computation in S140 and the results of computation in S230. Specifically, a ratio in connection with dependency on a wavelength of a relative light emission rate, dependency on a wavelength of light extraction efficiency, and dependency on a wavelength and an angle of intensity of light emission of the device is computed.

Then, an electroluminescence spectrum of the analyzed device is computed based on the results of computation in S240 and S130 (S250). Specifically, dependency on a wavelength of light extraction efficiency and dependency on a wavelength and an angle of intensity of light emission of the device are computed.

Then, desired characteristics of the analyzed device are computed (S260) based on the results of computation obtained in S250. Specifically, external quantum efficiency, a front luminance, a front color coordinate, dependency on an angle of the color coordinate, luminous efficiency [lm/w], and an emission spectrum and dependency on an angle thereof, and a characteristic value calculated from electric power efficiency are computed.

Then, the design variables are varied so as to be closer to target values (S270) based on comparison between the target values of the desired characteristics and analyzed values based on the results of computation of the desired characteristics of the analyzed device in S260. In this case, random computation, the design-of-experiments method, the steepest descent method, the Newton method, the conjugate gradient method, or a genetic algorithm is employed as the computation method. Thereafter, the process returns to S210, where the design variables of the analyzed device are determined (S210) and optimization loop R200 is executed.

The present embodiment relates to the method of designing an electroluminescent device having a plurality of functional layers lying between the transparent electrode and the second electrode and at least one emissive layer, the transparent member being in contact with the surface of the transparent electrode opposite to the emissive layer. An organic EL electroluminescent device 100 as shown in FIG. 22 represents a typical example of the electroluminescent device.

In organic EL electroluminescent device 100 shown in FIG. 22, ITO (having a thickness of 150 nm) as a transparent electrode 113 is provided on a glass substrate as a transparent member 110, and a first functional layer 114a, an emissive layer 114c (having a thickness of 20 nm), and a second functional layer 114e are provided through vapor deposition. Thereafter, an Ag film (having a thickness of 100 nm) which is a reflective electrode is provided as second electrode 15. A green phosphorescent material having an emission peak wavelength of 520 nm is employed for emissive layer 114c. A hole injection layer, a hole transfer layer, and an electron blocking layer (a total of 35 nm) are provided in first functional layer 114a. A hole blocking layer, an electron transfer layer, and an electron injection layer (a total of x nm) are provided in second functional layer 114e. Transparent member 110 is in contact with a surface of transparent electrode 113 opposite to emissive layer 114c.

Design variables in design of organic EL electroluminescent device 100 shown in FIG. 22 include a thickness and a complex relative permittivity of each of transparent member 110, transparent electrode 113, first functional layer 114a, second functional layer 114e, and second electrode 115 as well as positions and a distribution of light-emitting points in emissive layer 114c.

The design method in the present embodiment aims to realize a design optimizing external characteristics in current drive. The external characteristics in current drive represent indicators as desired characteristics shown in FIG. 29 which will be described later and any indicator computed by using values in FIGS. 23 and 25 to 28 which will be described later. Examples of specific indicators include electric power efficiency, current efficiency, external quantum efficiency, a front luminance, a front color coordinate (x, y), a front color temperature, a color rendering property, and dependency on an angle of the color coordinate. A method of analysis in each step in FIG. 21 will be described below.

"3.2 Measurement and Analysis of Current Drive Characteristics of Reference Device"

(3.2.1 Determination of Design Variables of Reference Device and Fabrication of Reference Device)

Design variables of a reference device are initially determined (S110). Typically, fabrication with a thickness minimum required for implementing each function is desirable. An example in which a thickness shown in FIG. 22 and x=50 nm are set will be described. The reference device can be fabricated with vacuum deposition. FIG. 23 summarizes design variables used for the reference device. The design variables include a thickness and a complex relative permittivity of each constituent member.

Transparent substrate 110 is formed from a glass substrate and has a thickness of 700 micrometers (0.7 mm) and a complex relative permittivity of ∈1. Transparent electrode 113 is composed of ITO and has a thickness of 150 nm and a complex relative permittivity of ∈2. First functional layer 114a is constituted of a hole injection layer, a hole transfer layer, and an electron blocking layer and has a thickness of 35 nm and a complex relative permittivity of ∈3. Emissive layer 114c is formed from a light-emitting layer and has a thickness of 20 nm and a complex relative permittivity of ∈4. Second functional layer 114e is constituted of a hole blocking layer, an electron transfer layer, and an electron injection layer and has a thickness of 50 nm and a complex relative permittivity of ∈5. Second electrode 115 is formed from an Ag film and has a thickness of 100 nm and a complex relative permittivity of ∈6. A position of a light-emitting point is located at the center of emissive layer 114c and a distribution is such that the light-emitting points are concentrated to the center like a delta function.

(3.2.2 Measurement of Reference Device)

Figures 24, 25:
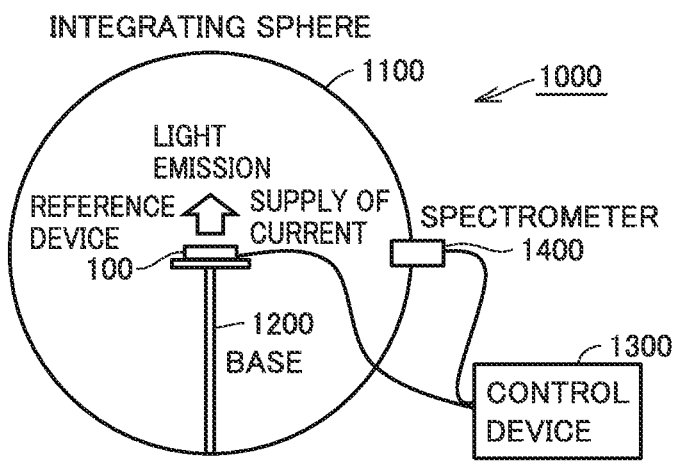
FIG. 24 is a diagram showing one example of a construction of an apparatus for measuring an external emission spectrum.
FIG. 25 is a diagram showing items of measurement data of the reference device.

An external emission spectrum is measured (S130) by applying a voltage to an electrode of the fabricated reference device (S120). FIG. 24 shows one example of a construction of an apparatus 1000 for measuring an external emission spectrum. A whole-angle spectrum is desirably measured by using an integrating sphere 1100 as the external emission spectrum of reference device 100. Therefore, reference device 100 is placed at a central portion of integrating sphere 1100 with the use of a base 1200.

In measuring a spectrum of reference device 100, a spectrometer 1400 is desirably used to record the number of photons for each wavelength in a control device 1300. A condition (a current and a voltage) of a power supply supplied to reference device 100 is recorded in control device 1300 in measurement. By doing so, measurement data of reference device 100 can be used for subsequent analysis.

FIG. 25 shows specific examples of measurement data. Measurement data includes a drive current (a notation $I_{in}$ and a unit [A]), a drive voltage (a notation $V_{in}$ and a unit [V]), an electroluminescence spectrum (a notation $S_{EL1}(\lambda)$ and a unit [/s/nm]), an area of a device (a notation $S_{dev}$ and a unit [m$^2$]), a temperature of a device (a notation $T_{dev}$ and a unit [K]), a front luminance (a notation $I_{cd}$ and a unit [cd/m$^2$]), a front color chromaticity x (a notation x and a unit dimensionless), a front color chromaticity y (a notation y and a unit dimensionless), and a front color temperature (a notation T and a unit [K]).

Data (for example, a barometric pressure) not shown in FIG. 25 is desirably recorded when it is necessary for subsequent analysis. Measurement of the external emission spectrum in a unit of the number of photons per unit time and unit wavelength facilitates conversion of characteristics such as external quantum efficiency. The electroluminescence spectrum measured here has been converted to the number of photons per unit time and unit wavelength. An electroluminescence spectrum measured in another unit can also be converted to the number of photons per unit time and unit wavelength based on a measurement condition. Conversion to an intensity spectrum can be carried out by multiplying a light spectrum in a unit of the number of photons by energy per one photon.

(3.2.3 Computation of Reference Device)

Referring back to FIG. 21, computation of the reference device is continued (S140). Computation of the reference device includes such a technique as quantum optical analysis, electromagnetic field analysis, and ray trace, and items which can be computed are different thereamong. FIG. 26 summarizes selection of items to be computed and an analysis technique.

Examples of items to be computed include dependency on a wavelength of a relative radiative recombination rate (Purcell factor) (a notation $F_1(\lambda)$, a unit dimensionless, and an analysis technique (quantum optical analysis·electromagnetic field analysis)), efficiency of light extraction into air (a notation $\eta_{Air1}(\lambda)$, a unit dimensionless, and an analysis technique (electromagnetic field analysis·ray trace)), a distribution of angles of light intensity in air at a specific wavelength (a notation $D_{Air1}(\lambda)$, a unit [/sr], and an analysis technique (electromagnetic field analysis·ray trace)), efficiency of light extraction into the transparent member (a notation $\eta_{Sub1}(\lambda)$, a unit dimensionless, and an analysis technique (electromagnetic field analysis·ray trace)), and a distribution of angles of light intensity in the transparent member at a specific wavelength (a notation $D_{Sub1}(\lambda)$, a unit [/sr], and an analysis technique (electromagnetic field analysis·ray trace)).

In any analysis, the design variables shown in FIG. 23 are used for analysis. Regarding each analysis technique, computation can be performed based on PTDs 1 and 2 and the electromagnetic field analysis technique. The distribution of angles of intensity is standardized such that 1 is attained when integrated by multiplying a solid angle (see an expression 11). In design of a device emitting light from opposing surfaces, standardization in the expression 11 is performed for light emission in each direction.

$$\int_0^{\pi/2} D_{Air1}(\lambda, \theta) 2\pi \sin\theta d\theta = 1 \quad \int_0^{\pi/2} D_{Sub1}(\lambda, \theta) 2\pi \sin\theta d\theta = 1 \quad (11)$$

Purcell factor represents a ratio of a radiative recombination rate when there is a microcavity formed of a dielectric or a metal in the surroundings to a radiative recombination rate of a light-emitting material alone, and it corresponds to $F(\lambda)$ in NPD 1. Description of measurement and analysis of current drive characteristics of the reference device thus ends.

"3.2 Optimization Loop"

Each procedure in the optimization loop will be described below with reference to FIG. 21.

(3.3.1 Determination of Design Variables of Analyzed Device)

Design variables of a device to be analyzed are determined (S210). A value of the design variable shown in FIG. 23 is varied. A specific method of varying a value includes the steepest descent method and a genetic algorithm as enhancing desired characteristics which will be described later. A combination of input variables is converted to a vector, and a first loop is expressed as x[1], a second loop is expressed as x[2], . . . , and an Nth loop is expressed as x[N].

(3.3.2 Computation of Analyzed Device)

Then, computation of the analyzed device is performed (S220 and S230). An item computed here is the same as the item to be computed of the reference device shown in FIG. 26. Attention should be paid to the fact that, with regard to design variables, change to the first loop expressed as x[1], the second loop expressed as x[2], . . . , and the Nth loop expressed as x[N] is made. A notation as defined in FIG. 27 is determined for the result of analysis of the Nth loop.

Items to be computed of the analyzed device in the Nth loop include dependency on a wavelength of a relative radiative recombination rate (Purcell factor) (a notation $F[N](\lambda)$, a unit dimensionless, and an analysis technique (quantum optical analysis·electromagnetic field analysis)), efficiency of light extraction into air (a notation $\eta_{Air}[N](\lambda)$, a unit dimensionless, and an analysis technique (electromagnetic field analysis·ray trace)), a distribution of angles of light intensity in air at a specific wavelength (a notation $D_{Air}[N](\lambda)$, a unit [/sr], and an analysis technique (electromagnetic field analysis·ray trace)), efficiency of light extraction into a transparent member (a notation $\eta_{Sub}[N](\lambda)$, a unit dimensionless, and an analysis technique (electromagnetic field analysis·ray trace)), and a distribution of angles of light intensity in the transparent member at a specific wavelength (a notation $D_{Sub}[N](\lambda)$, a unit [/sr], and an analysis technique (electromagnetic field analysis·ray trace)). Light extraction efficiency represents a ratio of light generated in the emissive layer which exits into air or a transparent member. Computation of light extraction efficiency of external quantum efficiency (EQE) is desirably corrected with the method in NPD 1 by using dependency on a wavelength of a relative radiative recombination rate (Purcell factor) described previously. By doing so, light extraction efficiency in current injection can accurately be computed.

(3.3.3 Computation of Ratio of Emission Intensity Between Analyzed Device and Reference Device and Electroluminescence Spectrum)

A ratio for computing an electroluminescence spectrum of the analyzed device is computed by using measurement items measured in current injection of the reference device shown in FIG. 25 (S240). An electroluminescence spectrum of the analyzed device is computed by using the intensity ratio described above (S250). Items computed here and notations are defined as in FIGS. 28 and 29.

Referring to FIG. 28, items to be computed of the analyzed device in the Nth loop include a ratio of intensity of energy which comes out into air to the reference device (a notation $G_{Air}$ [N] ($\lambda$) and a unit dimensionless), a ratio of intensity of energy which comes out into the transparent member to the reference device (a notation $G_{Sub}$ [N] ($\lambda$) and a unit dimensionless), a computed value of an electroluminescence spectrum (a notation $S_{EL}$ [N] ($\lambda$) and a unit [/s/nm]), and a computed value of an electroluminescence spectrum in the transparent member (a notation $S_{EL\_Sub}$ [N] ($\lambda$) and a unit [/s/nm]).

Referring to FIG. 29, an indicator value computed for the analyzed device in the Nth loop include electric power efficiency (a notation LPW [N] and a dimension [lm/W]), current efficiency (a notation LPA [N] and a dimension [lm/A]), external quantum efficiency (a notation EQE [N] and dimensionless), a front luminance (a notation Y [N] and a dimension [cd/m$^2$]), a front color coordinate x (a notation x [N] and dimensionless), a front color coordinate y (a notation y [N] and dimensionless), a front color temperature (a notation T [N] and [K]), a front color rendering property (a notation Ra [N] and dimensionless), dependency x on an angle of the color coordinate (a notation $x_\theta$ [N] ($\theta$) and dimensionless), and dependency y on an angle of the color coordinate (a notation $y_\theta$ [N] ($\theta$) and dimensionless).

Measurement of reference device 100 shown in FIG. 24 is described as measurement of a spectrum which comes out into outside air of the device. A ratio of intensity and a computed value of the external emission spectrum shown in FIG. 28 are computed in an expression (12) using an experimental electroluminescence spectrum shown in FIG. 25.

$$\left. \begin{array}{c} G_{Air}[N](\lambda) = \dfrac{S_{EL}[N](\lambda)}{S_{EL1}(\lambda)} \\ S_{EL}[N](\lambda) = G_{Air}[N](\lambda)S_{EL1}(\lambda) \\ G_{Sub}[N](\lambda) = \dfrac{S_{EL\_Sub}[N](\lambda)}{S_{EL1}(\lambda)} \\ S_{EL\_Sub}[N](\lambda) = G_{Sub}[N](\lambda)S_{EL1}(\lambda) \end{array} \right\} \quad (12)$$

A ratio of intensity of energy which comes out into air between the reference device and the analyzed device is computed with the existing quantum optical analysis technique, the electromagnetic field analysis technique, and the ray trace technique shown in FIG. 27.

What is important here is computation of an electroluminescence spectrum of the analyzed device (S240 and S250) by using a measured value of the electroluminescence spectrum of the reference device (S130), the result of computation of the reference device (S140), and the result of computation of the analyzed device (S230). By carrying out computation as such, an external light emission electroluminescence spectrum in current injection can accurately be computed.

(3.3.4 Computation of Desired Characteristics of Analyzed Device)

A distribution of wavelengths of external emission spectra and a distribution of angles of light intensity in air or in the inside of the transparent member in any Nth computation are analyzed (S260) based on the results of analysis until the section 3.3.3. When one is interested in a color coordinate of emitted light, a color coordinate can be computed by carrying out computation under the definition by Commission Internationale de l'Eclairage (CIE) by using the computed spectrum and the distribution of angles.

Electric power efficiency of the analyzed device can also be computed based on the conditions for driving the reference device shown in FIG. 25 and the results of computation shown in FIGS. 26 to 28. A luminance or a distribution of angles of the color coordinate can also be computed by using characteristics of the distribution of angles shown in FIG. 27. FIG. 29 lists indicators which can be computed as desired characteristics.

Desired characteristics are not limited to the indicators listed in FIG. 29 but also may include any indicator which is computed by using values listed in FIGS. 23 and 25 to 28. For example, when variation in indicator value resulting from minor variation in certain design variable in the vicinity of the certain design variable is employed as a new indicator value and optimization is carried out so as to minimize the variation, a robust design solution can be derived and design can be suited to mass production. Though not shown in FIG. 29, a color rendering property of color samples from R1 to R15 may independently be evaluated other than Ra as an indicator for the color rendering property. By thus independently evaluating a color rendering property of color samples, which color is well reproduced can be quantified and performance as lighting can more finely be designed.

(3.3.5 Comparison of Target Value with Analyzed Value of Desired Characteristics and Change Design Variable to be Closer to Target Value)

As Nth design variable x [N] which is a set of design variables as a vector is determined based on the description so far, desired characteristics exemplified in FIG. 30 are computed from the electroluminescence spectrum of the reference device found in experiments.

Referring to FIG. 30, regarding the design variables of an optimized device, transparent substrate 110 is formed from a glass substrate having a thickness of 700 micrometers (0.7 mm) and a complex relative permittivity of ∈1. Transparent electrode 113 is composed of ITO and has a thickness of 150 nm and a complex relative permittivity of ∈2. First functional layer 114a is constituted of a hole injection layer, a hole transfer layer, and an electron blocking layer and has a thickness of 37 nm and a complex relative permittivity of ∈3. Emissive layer 114c is formed from a light-emitting layer and has a thickness of 20 nm and a complex relative permittivity of ∈4. Second functional layer 114e is constituted of a hole blocking layer, an electron transfer layer, and an electron injection layer and has a thickness of 113 nm and a complex relative permittivity of ∈5. Second electrode 115 is formed from an Ag film and has a thickness of 100 nm and a complex relative permittivity of ∈6.

N+1th computation is carried out based on this result, and desired characteristics are brought closer to target values (S270). An algorithm for repeated computation includes the steepest descent method, the conjugate gradient method, and a genetic algorithm as enhancing desired characteristics. Any existing optimization algorithm may be employed. Referring back to the Section 3.3.1, optimization loop R200 is continued. Optimization loop R200 ends when it is determined that desired characteristics are sufficiently close or the defined number of repetitions is completed.

In optimization, an evaluation function is desirably determined and an algorithm is designed so as to minimize or maximize the evaluation function. For example, in optimization to bring the front color coordinate (x, y) closer to a target color coordinate ($x_{target}$, $y_{target}$), an error in color coordinate is determined as the evaluation function as in an expression (13) below, and the steepest descent method, the conjugate gradient method, or the genetic algorithm is desirably designed so as to minimize the evaluation function.

$$\Delta xy = \sqrt{(x-x_{target})^2 + (y-y_{target})^2} \quad (13)$$

In order to improve efficiency in computation, design variables x[1], x[2], . . . , x[N] are determined in advance based on the design-of-experiments method, and parallel computation is desirably performed for combination of N design variables. Computation using a graphics processing unit (GPU), computation using cluster machines, or computation using multiple CPUs is employed for parallel computation.

(3.3.6 Example of Specific Optimization Loop)

A device shown in FIG. 23 was employed as the reference device, a front color coordinate (x, y) was employed as desired characteristics, and optimization computation was conducted so as to bring a target front color coordinate closer to a green coordinate (0.30, 0.60) of sRGB. Thicknesses of a plurality of functional layers were employed as design variables. The design-of-experiments method was adopted as the optimization technique, and a plurality of levels were simultaneously computed by carrying out parallel computation using multiple CPUs.

A difference Δxy (see an expression (14) below) from a target coordinate of a (x, y) color coordinate was employed as a desired characteristic, and Δxy=0 was set as a target value. Optimization computation was aborted at N=256.

$$\Delta xy = \sqrt{(x-0.3)^2 + (y-0.6)^2} \quad (14)$$

FIG. 31 shows a result of optimization computation. A level number N was renumbered in the descending order of magnitude of error. It can be seen in FIG. 31 that a combination x[256] of design variables is smallest in difference Δxy in the computation and it is a desirable combination of design variables. FIG. 30 shows design variable x[256] as the optimization result. It can be seen that the reference device and the design variables in FIG. 23 were varied. It can thus be seen that optimization for bringing desired characteristics closer to the target values can be realized by deriving "relation between the design variables and the desired characteristics."

[4. Details of Method of Manufacturing Electroluminescent Device]

FIG. 32 shows a flow in application of the design method in the embodiment to the method of manufacturing an electroluminescent device. As described in [3. Details of Design Method], optimization loop R200 is once run so as to output an optimal design. Then, an electroluminescent device is manufactured based on the optimal design variables. Thereafter, the manufactured electroluminescent device is inspected so as to measure and analyze current drive characteristics.

With the inspected electroluminescent device being defined as the reference device, optimization loop R200 is again run and feedback is given to the manufacturing process. By thus applying the design method in the embodiment to the manufacturing method, an electroluminescent device having a desired characteristic value can be manufactured in a stable manner.

EXAMPLES

[5.1 Single-Emission Light-Emitting Device]

In order to describe the effect of the present embodiment in further detail, description will be given below with reference to analysis of an organic electroluminescent device. Organic EL electroluminescent device 100 to be analyzed has a structure shown in FIG. 22, in which ITO (having a thickness of 150 nm) was provided as transparent electrode 113 on a glass substrate as transparent member 110 and first functional layer 114a, emissive layer 114c (having a thickness of 20 nm), and second functional layer 114e were provided through vacuum vapor deposition. Thereafter, an Ag film (having a thickness of 100 nm) serving as a reflective electrode was provided as second electrode 15. A green phosphorescent material having an emission peak wavelength of 520 nm was employed for emissive layer 114c. First functional layer 114a was constituted of a hole injection layer, a hole transfer layer, and an electron blocking layer (a total of 35 nm). Second functional layer 114e was constituted of a hole blocking layer, an electron transfer layer, and an electron injection layer (a total of x nm). Experiments and computation were compared with each other, with the total thickness from the hole blocking layer to the electron injection layer being varied.

FIG. 33 shows experimental results and results of comparison between the analysis method in the background art and the analysis method in the present Example. FIG. 34 shows an error between experiments and analysis. It can be seen that the present Example achieves accurate computation of a color chromaticity and external quantum efficiency in the experiments. By using the analysis technique in the present Example, a more accurate color chromaticity and efficiency can be computed. Similar analysis is also applicable to analysis of a single-emission electroluminescent device shown in FIGS. 5 to 20.

[5.2 Transparent Light-Emitting Device]

The design method in the present embodiment is applicable to electroluminescent devices 1F to 1H representing transparent light-emitting devices shown in FIGS. 8 to 10. A quantity or a color of light extracted to the outside from opposing sides can accurately be estimated by carrying out the method of designing an electroluminescent device in the present embodiment on a transparent light-emitting device.

[5.3 Construction Including Optical Buffer Layer]

The design method in the present embodiment is applicable to electroluminescent devices 1I to 1J including the optical buffer layer shown in FIGS. 11 and 12. A device with a desired color of which efficiency is optimized can be designed by optimizing the design making use of an effect of improvement in luminous efficiency owing to the microcavity effect of the optical multi-layer with the design method in the present embodiment.

[5.4 Construction Including Optical Microstructure]

The design method in the present embodiment is applicable to electroluminescent devices 1K to 1M including the optical microstructure shown in FIGS. 13 to 16. A light-emitting device high in luminous efficiency and less in deviation in emission intensity or color for each angle can be realized by designing efficiency in extraction of waveguide mode light or plasmon light with the design method in the present embodiment.

[5.5 Construction Including Second Optical Microstructure]

The design method in the present embodiment is applicable to electroluminescent device 1O including the second optical microstructure shown in FIG. 17. A light-emitting device high in luminous efficiency and less in deviation in emission intensity or color for each angle can be realized by realizing design which allows efficient scattering of substrate mode light.

[5.6 Electroluminescent Device]

Electroluminescent devices 1A to 1O designed by applying the design method in the present embodiment as shown in FIGS. 5 to 17 are useful as a surface-emitting light source which can highly efficiently exhibit a desired color. This is also applicable to electroluminescent devices 1P to 1R shown in FIGS. 18 to 20.

The method of designing an electroluminescent device in the background art computes an external light spectrum of an electroluminescent device resulting from current injection based on a photoluminescence spectrum, and disadvantageously, an actual external emission spectrum of the electroluminescent device is different from the computed external emission spectrum, and luminous efficiency or a color coordinate of the electroluminescent device cannot accurately be computed.

In the method of designing an electroluminescent device in the present embodiment, however, an external emission spectrum of an analyzed device is computed based on an external emission spectrum of a reference device, so that an electroluminescent device can be manufactured with accurate efficiency or color coordinate being computed and desired characteristics being optimized.

As set forth above, according to the embodiment, an external emission spectrum output to the outside in a current injection state can more accurately be computed and a quantity or a color of light extracted to the outside can accurately be estimated. By adopting the present embodiment in a transparent light-emitting device, a quantity or a color of light extracted to the outside on opposing sides can accurately be estimated. An electroluminescent device with a desired color of which efficiency is optimized can be designed by optimizing the design making use of the effect of improvement in luminous efficiency owing to the microcavity effect of the optical multi-layer with the technique in the present embodiment.

An electroluminescent device high in luminous efficiency and less in deviation in emission intensity or color for each angle can be realized by designing efficiency in extraction of waveguide mode light or plasmon light with the design method in the present embodiment. An electroluminescent device high in luminous efficiency and less in deviation in emission intensity or color for each angle can be realized by designing efficiency in scattering of substrate mode light with the design method in the present embodiment. An electroluminescent device designed with the design method in the present embodiment can highly efficiently realize a desired color chromaticity.

Though a method of designing an electroluminescent device, an electroluminescent device manufactured with the design method, and a method of manufacturing an electroluminescent device with the design method in the present embodiment have been described above, it should be understood that the embodiment disclosed herein is illustrative and non-restrictive in every respect. Therefore, the scope of the present invention is defined by the terms of the claims and is intended to include any modifications within the scope and meaning equivalent to the terms of the claims.

REFERENCE SIGNS LIST 1A, 1B, 1C, 1D 1E, 1F, 1G, 1H, 1I, 1J, 1K, 1L, 1N, 1M, 1O, 1P, 1Q, 1R (organic 41) electroluminescent device; 10 first transparent member (sealing member); 13 transparent electrode (first electrode); 13a, 13c conductive resin; 13b small-thickness A1 (small-thickness metal electrode); 14, 14A light-emitting layer; 14B, 14D charge generation layer; 14C second light-emitting layer; 14E third light-emitting layer; 14a hole injection layer; 14b hole transfer layer; 14c emissive layer; 14d electron transfer layer; 14e electron injection layer; 14c emissive layer; 15 reflective electrode (second electrode); 16 support substrate; 17 second transparent member; 19 second optical buffer layer; 21 first optical microstructure; 21a, 21b light scattering layer; 21c smooth layer; 21d metal projection and recess structure; 21e transparent conductive film; 23 third electrode (transparent electrode); 24 fourth electrode (transparent electrode); 25 fifth electrode (transparent electrode); 26 sixth electrode (transparent electrode); 31 second optical microstructure; 31b transparent layer; 31a light scattering particle; 40 reflection member (Ag); 41, 42, 43, 44 optical buffer layer; 45 reflection member; 100 organic EL electroluminescent device; 110 transparent member; 113 transparent electrode; 114a first functional layer; 114c emissive layer; 114e second functional layer; and 115 second electrode.

The invention claimed is:

1. A method of designing an electroluminescent device having an emissive layer between a first electrode and a second electrode, the first electrode and the second electrode being transparent electrodes, the emissive layer lying between a first functional layer and a second functional layer, the electroluminescent device having a first transparent member on a side of the first electrode opposite to a side where the emissive layer is provided, the method comprising:

preparing a reference device including a construction of the electroluminescent device and a desired analyzed device including a construction of the electroluminescent device;

performing quantum optical analysis, electromagnetic analysis, and ray trace with thicknesses and complex relative permittivities of the first transparent member, the first electrode, the first functional layer, the second functional layer, the emissive layer, and the second electrode as well as a position of a light-emitting point in the emissive layer and a distribution of light-emitting points in the emissive layer being used as design variables;

calculating a "ratio of light extraction efficiency" between the reference device and the analyzed device by computing efficiency of light extraction from the emissive layer into the transparent member or air in both of the reference device and the analyzed device;

finding relation of the thickness and the complex relative permittivity of each of the layers with the "ratio of light extraction efficiency," the layers forming the reference device and the analyzed device; and obtaining the respective thicknesses and the respective complex relative permittivities of the first transparent member, the first electrode, the first functional layer, the second functional layer, the emissive layer, and the second electrode as the design variables, based on the relation and an electroluminescence spectrum in air or the first transparent member measured by feeding a current to the reference device.

2. The method of designing an electroluminescent device according to claim 1, wherein
the second electrode is a transparent electrode, a second transparent member is provided on a side of the second electrode opposite to a side where the emissive layer is provided, and a complex relative permittivity and a thickness of the second transparent member are further included as design variables.

3. The method of designing an electroluminescent device according to claim 2, wherein
an optical buffer layer is further provided between the second electrode and the first transparent member and/or between the second electrode and the second transparent member, and
the method further comprises designing a thickness, a complex relative permittivity, and a structure constant of each film forming the optical buffer film as design variables.

4. The method of designing an electroluminescent device according to claim 1, wherein
a first optical microstructure disturbing amplitude and a phase condition of light is further provided in any region between the transparent member and the emissive layer, and
the method further comprises designing a structure constant and a complex relative permittivity of the first optical microstructure as design variables.

5. The method of designing an electroluminescent device according to claim 1, wherein
a second optical microstructure disturbing amplitude and a phase condition of light is provided at an interface between the first transparent member and outside, and
a structure constant and a complex relative permittivity of the second optical microstructure are included as design variables.

6. An electroluminescent device designed with the method of designing an electroluminescent device according to claim 1.

7. A method of manufacturing an electroluminescent device comprising:
inspecting an electroluminescent device manufactured based on the design variables obtained with the method of designing an electroluminescent device according to claim 1 and measuring and analyzing current drive characteristics; and
obtaining the design variables with the method of designing an electroluminescent device according to claim 1 with the measured and analyzed electroluminescent device being defined as the reference device and manufacturing an electroluminescent device based on the design variables.

* * * * *